(12) United States Patent
Yoshikawa

(10) Patent No.: US 11,801,688 B2
(45) Date of Patent: Oct. 31, 2023

(54) RECORDING CONTROL DEVICE AND RECORDING CONTROL METHOD

(71) Applicant: SEIKO EPSON CORPORATION, Tokyo (JP)

(72) Inventor: Eishin Yoshikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/481,373

(22) Filed: Sep. 22, 2021

(65) Prior Publication Data

US 2022/0088939 A1 Mar. 24, 2022

(30) Foreign Application Priority Data

Sep. 24, 2020 (JP) .................................. 2020-159563

(51) Int. Cl.
*B41J 2/21* (2006.01)
*B41J 2/155* (2006.01)
*B41J 2/045* (2006.01)

(52) U.S. Cl.
CPC .......... *B41J 2/2146* (2013.01); *B41J 2/04505* (2013.01); *B41J 2/155* (2013.01); *B41J 2/2135* (2013.01)

(58) Field of Classification Search
CPC .... B41J 2/2132; B41J 2/2135; B41J 2/04505; B41J 2/04581; B41J 2/155; B41J 2/2146; B41J 2/04558; B41J 2/04573; B41J 29/38; B41J 2/04595; G06K 15/107; G06K 15/105; G06K 15/102

See application file for complete search history.

(56) References Cited

U.S. PATENT DOCUMENTS

2012/0081439 A1* 4/2012 Goto ...................... B41J 2/2146
347/14
2016/0089908 A1 3/2016 Matsuura

FOREIGN PATENT DOCUMENTS

JP 2019-018582 A 2/2019

\* cited by examiner

*Primary Examiner* — Jannelle M Lebron
(74) *Attorney, Agent, or Firm* — Global IP Counselors, LLP

(57) ABSTRACT

A recording control device. A first portion control section forms a first portion as a portion that is continuous from a first region and is not continuous to a second region in a recording region in an output image that is formed on a medium in an overlapping region in a recording region, in such a manner that a use rate of a first nozzle row of an overlapping portion of a nozzle row is set to a first nozzle use rate. A second portion control section forms a second portion as a portion that is continuous with the first region and the second region in the output image in the overlapping region, in such a manner that the use rate of the first nozzle row of the overlapping portion is set to the second nozzle use rate.

10 Claims, 17 Drawing Sheets

RECORDING CONTROL DEVICE AND RECORDING CONTROL METHOD

The present application is based on, and claims priority from JP Application Serial Number 2020-159563, filed Sep. 24, 2020, the disclosure of which is hereby incorporated by reference herein in its entirety.

BACKGROUND

1. Technical Field

The present disclosure relates to a recording control device and a recording control method for controlling formation of an output image on a medium.

2. Related Art

As a recording head, a long recording head including a plurality of nozzle rows that are partially overlap each other in a nozzle alignment direction is known. In an overlapping region corresponding to an overlapping portion where the plurality of nozzle rows overlaps each other in a recording region where recording on a medium is performed by a recording head, the plurality of nozzle rows is used for the recording.

In addition, as a recording device, a printer that repeats a main scan including recording on a medium by the recording head, and a sub scan of shifting the recording range of the main scan is known. Here, in an overlapping region corresponding to an overlapping portion where the nozzle row during the first main scan and the nozzle row during the second main scan overlap each other in the recording region where recording on the medium is performed by the recording head through two main scans with a sub scan therebetween, the nozzle row is used for the recording in the two main scans.

In the ink-jet printer disclosed in JP-A-2019-018582, a use boundary position is set in a partially overlapping range in two paths, and the overlapping range is divided at the use boundary position into a portion that is printed by only the former path and a portion that is printed by only the later path.

A difference in density may be caused between a non-overlapping range printed by one path and the partially overlapping range printed by two paths, due to the properties of the ink, the medium errors of the feeding amount during the sub scan and the like. As a result, a streak extending along the main scan direction may be formed in the overlapping range.

In addition, in the case where a recording head including two nozzle rows that partially overlap each other in the nozzle alignment direction is used, the non-overlapping region printed by one nozzle row and the overlapping region printed by two nozzle rows are generated. A density difference may be caused between the non-overlapping region and the overlapping region due to the properties of the ink and the medium, the error of the relative position of the nozzle rows and the like. As a result, a streak extending along the scan direction may be formed in the overlapping range.

SUMMARY

A recording control device of the present disclosure is configured to control recording on a medium by a recording head including a plurality of nozzle rows, and a relative movement of the recording head and the medium in a relative movement direction that intersects a nozzle alignment direction of the plurality of nozzle rows. The plurality of nozzle rows include a first nozzle row, and a second nozzle row that partially overlaps the first nozzle row in the nozzle alignment direction, when, in a recording region that is recorded on the medium during the relative movement, a region corresponding to a portion where the first nozzle row is present and the second nozzle row is not present is a first region, a region corresponding to an overlapping portion where the first nozzle row and the second nozzle row overlap each other is an overlapping region, a region corresponding to a portion where the second nozzle row is present and the first nozzle row is not present is a second region, a portion that is continuous from the first region and is not continuous to the second region in an output image that is formed on the medium in the overlapping region is a first portion, and a portion that is continuous with the first region and the second region in the output image in the overlapping region is a second portion, a first portion control section configured to form the first portion in such a manner that a use rate of the first nozzle row of the overlapping portion is set to a first nozzle use rate, and a second portion control section configured to form the second portion in such a manner that the use rate of the first nozzle row of the overlapping portion is set to a second nozzle use rate are provided, and the first nozzle use rate is higher than the second nozzle use rate.

A recording control device of the present disclosure is configured to control recording on a medium by a recording head including a nozzle row, a plurality of main scans in which the recording head and the medium relatively move in a main scan direction that intersects a nozzle alignment direction of the nozzle row, and a sub scan in which the recording head and the medium relatively move in a feed direction that intersects the main scan direction. The plurality of main scans include a first main scan, and a second main scan in which an arrangement of the nozzle row in the feed direction partially overlaps the first main scan, when, in a recording region that is recorded on the medium during the first main scan and the second main scan, a region corresponding to a portion where the nozzle row is present during the first main scan and the nozzle row is not present during the second main scan is a first region, a region corresponding to an overlapping portion where the nozzle row is present during the first main scan and the second main scan is an overlapping region, a region corresponding to a portion where the nozzle row is present during the second main scan and the nozzle row is not present during the first main scan is a second region, a portion that is continuous from the first region and is not continuous to the second region in an output image that is formed on the medium in the overlapping region is a first portion, and a portion continuous with the first region and the second region in the output image in the overlapping region is a second portion, a first portion control section configured to form the first portion in such a manner that a use rate of the nozzle row during the first main scan in the overlapping portion is set to a first nozzle use rate, and a second portion control section configured to form the second portion in such a manner that the use rate of the nozzle row during the first main scan in the overlapping portion is set to a second nozzle use rate are provided, and the first nozzle use rate is higher than the second nozzle use rate.

A recording control method of the present disclosure is a method of controlling recording on a medium by a recording head including a plurality of nozzle rows, and a relative movement of the recording head and the medium in a relative movement direction that intersects a nozzle alignment direction of the plurality of nozzle rows. The plurality of nozzle rows include a first nozzle row, and a second nozzle row that partially overlaps the first nozzle row in the nozzle alignment direction, when, in a recording region that is recorded on the medium during the relative movement, a region corresponding to a portion where the first nozzle row is present and the second nozzle row is not present is a first region, a region corresponding to an overlapping portion where the first nozzle row and the second nozzle row overlap each other is an overlapping region, a region corresponding to a portion where the second nozzle row is present and the first nozzle row is not present is a second region, a portion that is continuous from the first region and is not continuous to the second region in an output image that is formed on the medium in the overlapping region is a first portion, and a portion that is continuous with the first region and the second region in the output image in the overlapping region is a second portion, the method includes a first portion control step of forming the first portion in such a manner that a use rate of the first nozzle row of the overlapping portion is set to a first nozzle use rate, and a second portion control step of forming the second portion in such a manner that the use rate of the first nozzle row of the overlapping portion is set to a second nozzle use rate, and the first nozzle use rate is higher than the second nozzle use rate.

A recording control method of the present disclosure is a method of controlling recording on a medium by a recording head including a nozzle row, a plurality of main scans in which the recording head and the medium relatively move in a main scan direction that intersects a nozzle alignment direction of the nozzle row, and a sub scan in which the recording head and the medium relatively move in a feed direction that intersects the main scan direction. The plurality of main scans include a first main scan, and a second main scan in which an arrangement of the nozzle row in the feed direction partially overlaps the first main scan, when, in a recording region that is recorded on the medium during the first main scan and the second main scan, a region corresponding to a portion where the nozzle row is present during the first main scan and the nozzle row is not present during the second main scan is a first region, a region corresponding to an overlapping portion where the nozzle row is present during the first main scan and the second main scan is an overlapping region, a region corresponding to a portion where the nozzle row is present during the second main scan and the nozzle row is not present during the first main scan is a second region, a portion that is continuous from the first region and is not continuous to the second region in an output image that is formed on the medium in the overlapping region is a first portion, and a portion continuous with the first region and the second region in the output image in the overlapping region is a second portion, the method includes a first portion control step of forming the first portion in such a manner that a use rate of the nozzle row during the first main scan in the overlapping portion is set to a first nozzle use rate, and a second portion control step of forming the second portion in such a manner that the use rate of the nozzle row during the first main scan in the overlapping portion is set to a second nozzle use rate, and the first nozzle use rate is higher than the second nozzle use rate.

DESCRIPTION OF EXEMPLARY EMBODIMENTS

Figure 1:
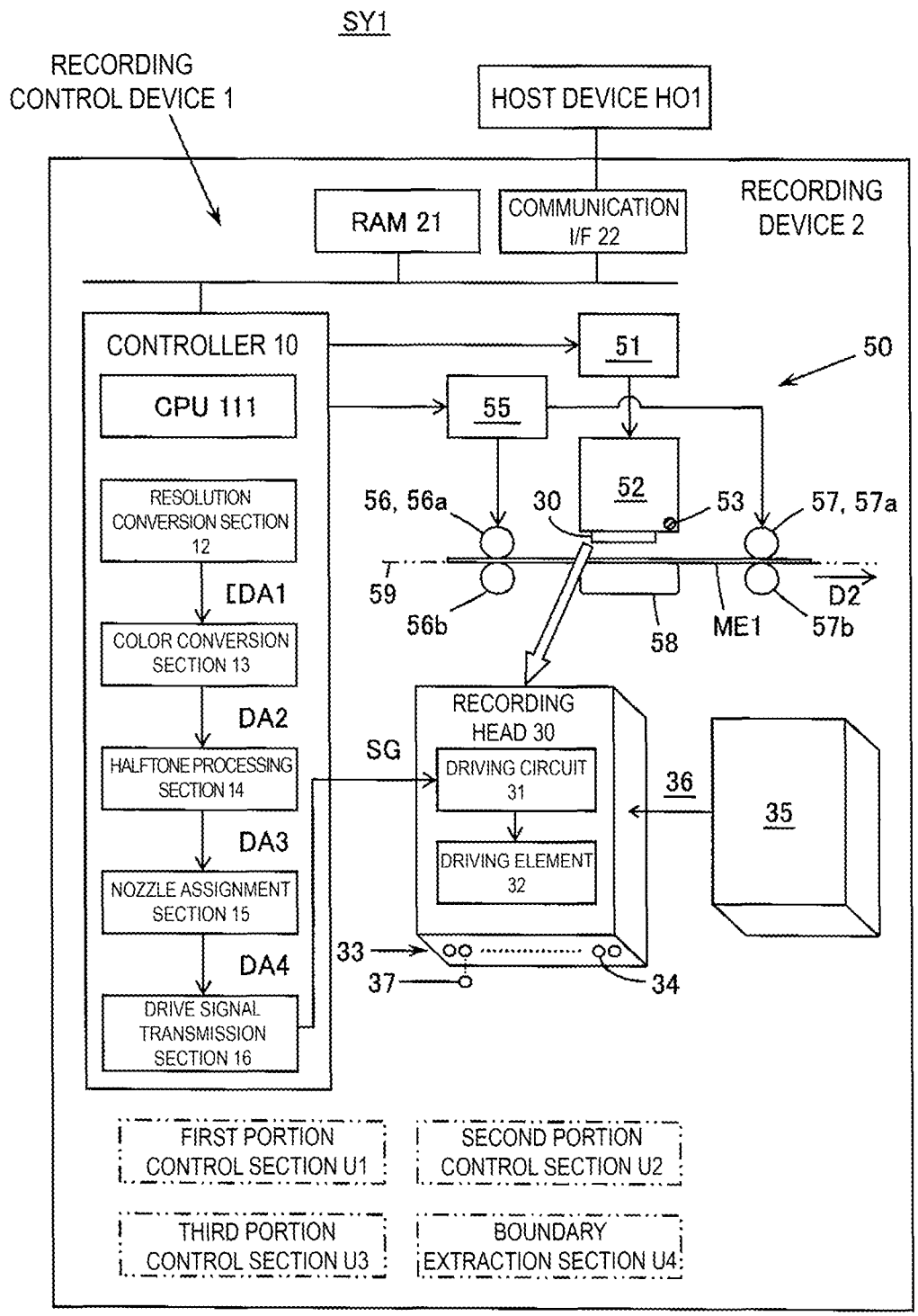
FIG. 1 is a drawing schematically illustrating an example of a recording control system including a recording control device.

Embodiments of the present disclosure are described below. Naturally, the embodiments described below are merely examples of the present disclosure, and not all of the features described in the embodiments may be essential to the solution of the disclosure.

(1) Overview of Technique Encompassed in Present Disclosure

First, an overview of techniques encompassed in the present disclosure is described with reference to examples illustrated in FIGS. 1 to 17. Note that the drawings of the subject application schematically illustrate examples, and the magnification in each direction in the drawings may be different from each other, and, the drawings may not be consistent with each other. Naturally, the elements of the present technology are not limited to the specific examples denoted with the reference numerals. In "Overview of Technique Encompassed in Present Disclosure", the words in the parentheses are a supplementary explanation of the preceding term.

First Aspect

As exemplified in FIGS. 1 to 12, a recording control device 1 according to an aspect of the present technology controls recording on a medium ME1 by a recording head 30 including a plurality of nozzle rows 33, and a relative movement of the recording head 30 and the medium ME1 in a relative movement direction D4 that intersects a nozzle alignment direction D3 of the nozzle row 33, and the recording control device 1 includes a first portion control section U1 and a second portion control section U2. The plurality of nozzle rows 33 includes a first nozzle row 41 and a second nozzle row 42 that partially overlaps the first nozzle row 41 in the nozzle alignment direction D3. Here, in a recording region A0 where recording is performed on the medium ME1 when the relative movement is performed, a region corresponding to a portion 44 where the first nozzle row 41 is present and the second nozzle row 42 is not present is a first region A1, a region corresponding to an overlapping portion 43 where the first nozzle row 41 and the second nozzle row 42 overlap each other is an overlapping region A3, and a region corresponding to a portion 45 where the second nozzle row 42 is present and the first nozzle row 41 is not present is a second region A2. With a first portion IM1 set as a portion that is continuous from the first region A1 and is not continuous to the second region A2 in an output image IM0 to be formed on the medium ME1 in the overlapping region A3, the first portion control section U1 forms the first portion IM1 in such a manner that the use rate of the first nozzle row 41 of the overlapping portion 43 is set to a first nozzle use rate R1. With a second portion IM2 set as a portion continuous from the first region A1 and the second region A2 in the output image IM0 to be formed in the overlapping region A3, the second portion control section U2 forms the second portion IM2 in such a manner that the use rate of the first nozzle row 41 of the overlapping portion 43 is set to a second nozzle use rate R2. The first nozzle use rate R1 is higher than the second nozzle use rate R2.

In the output image IM0 in the overlapping region A3, the first portion IM1, which is continuous from the first region A1 and is not continuous to the second region A2, is higher in the use rate of the first nozzle row 41 than the second portion IM2, which is continuous from the first region A1 and the second region A2. Thus, the difference in the appearance between the first portion IM1 in the overlapping region A3 and an image portion continuous from the first portion IM1 in the first region A1 is small. On the other hand, it is unlikely to cause uncomfortable feeling even if there is a difference in appearance between the first portion IM1 in the overlapping region A3 and an image portion in the second region A2 that is not continuous from the first portion IM1. Thus, the above-mentioned aspect can provide a recording control device that can improve the image quality of the output image in the overlapping region corresponding to an overlapping portion where the first nozzle row and the second nozzle row overlap each other in the nozzle alignment direction in the recording region.

Here, the nozzle row means a plurality of aligned nozzles used for the recording, and does not include an end nozzle that is not used for the recording.

The relative movement of the recording head and the medium includes a movement of the medium with no movement of the recording head, a movement of the recording head with no movement of the medium, and a movement of both the recording head and the medium.

The relative movement direction may be orthogonal to the nozzle alignment direction, or may obliquely intersect the nozzle alignment direction without being orthogonal to the nozzle alignment direction.

Note that the above-described notes apply also to the following aspects.

Second Aspect

Figure 3:
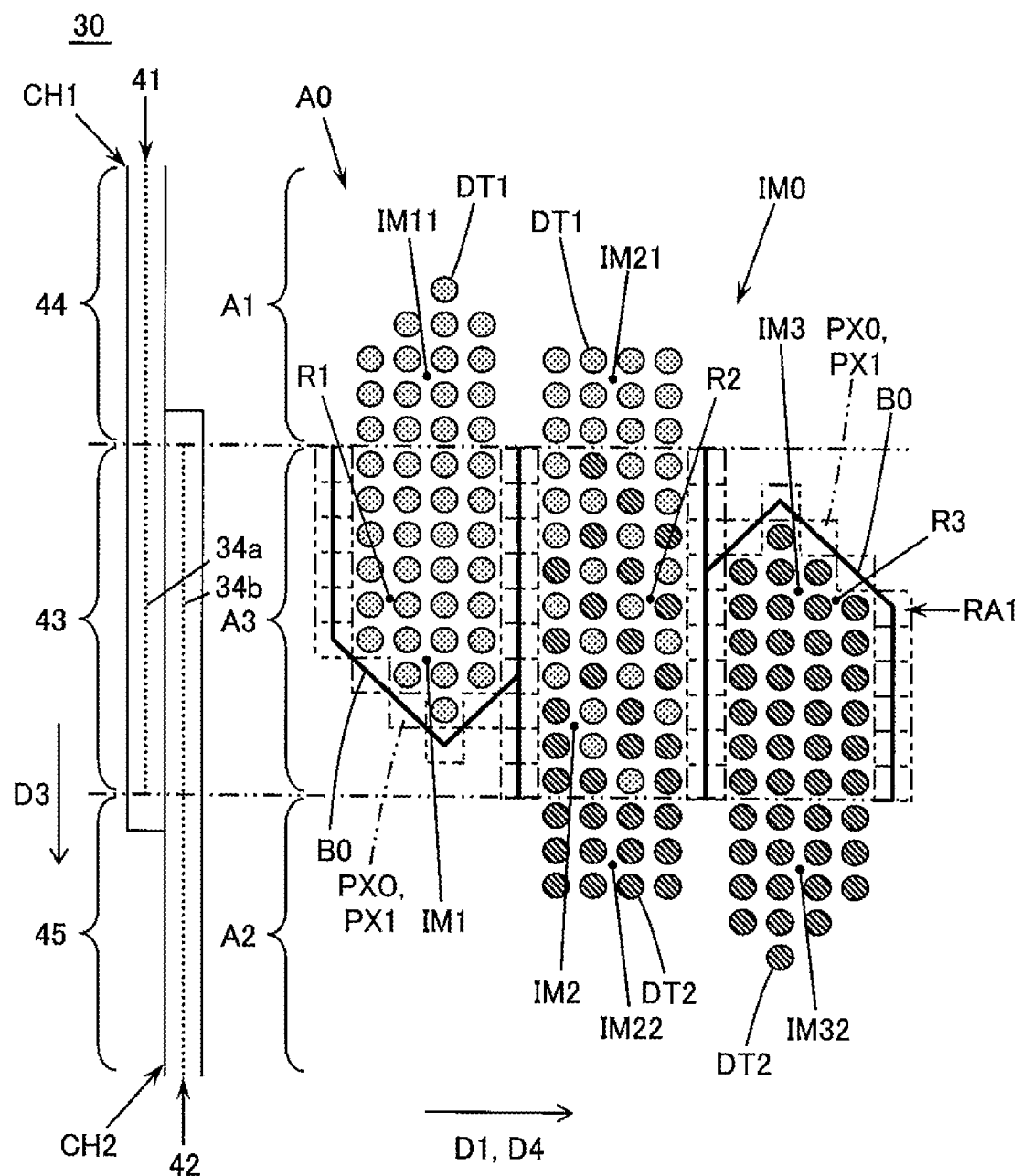
FIG. 3 is a drawing schematically illustrating an example of an output image formed in a recording region.
Figure 9:
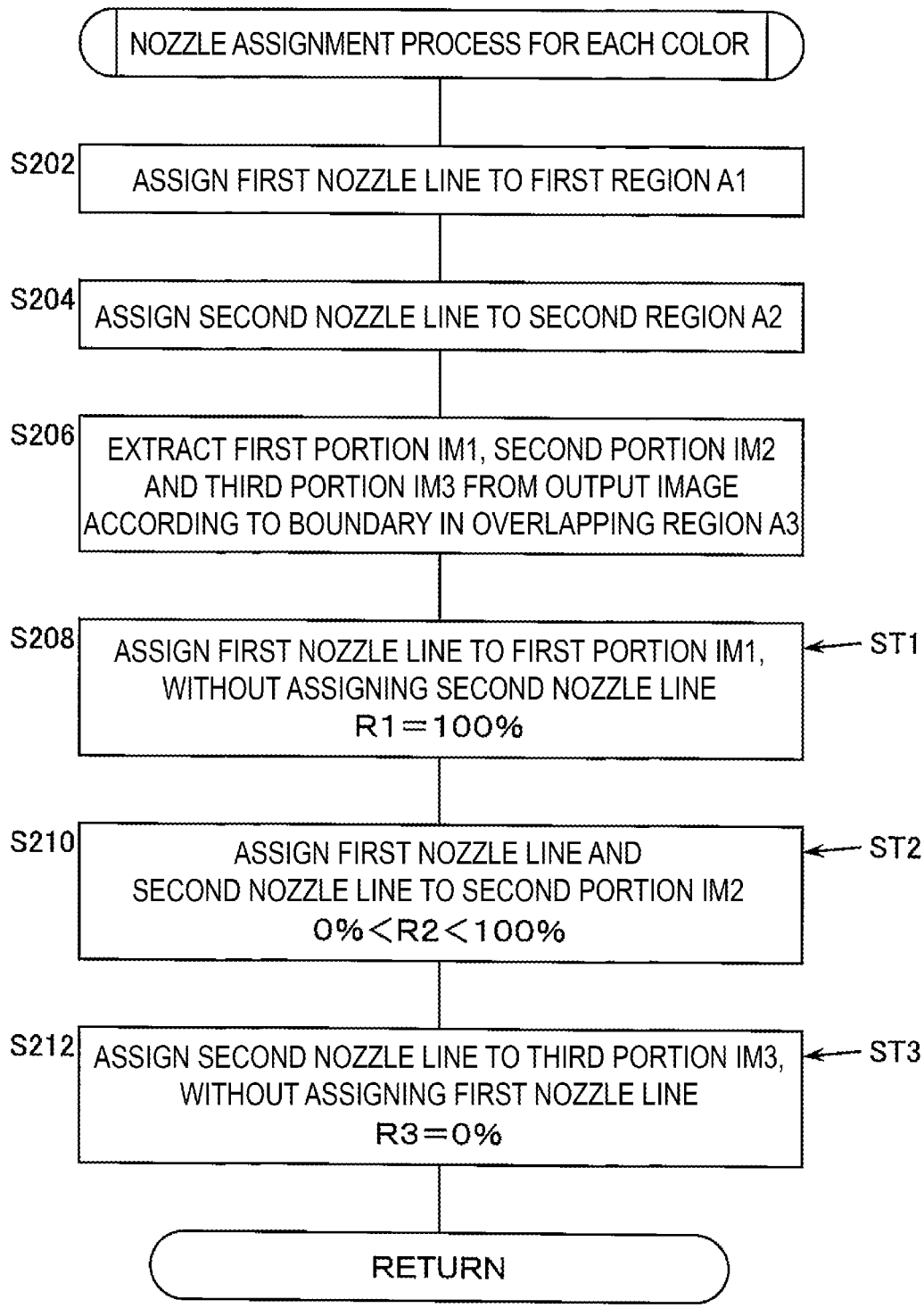
FIG. 9 is a drawing schematically illustrating an example of a nozzle assignment process at R1=100% and R3=0%.

As exemplified in FIGS. 3 and 9 and the like, the first portion control section U1 may form the first portion IM1 without using the second nozzle row 42. This aspect can further improve the image quality of the output image in the overlapping region.

Third Aspect

With a third portion IM3 set as portion that is continuous from the second region A2 and is not continuous to the first region A1 in the output image IM0 in the overlapping region A3, the recording control device 1 may further include a third portion control section U3 that forms the third portion IM3 in such a manner that the use rate of the first nozzle row 41 of the overlapping portion 43 is set to a third nozzle use rate R3. The third nozzle use rate R3 may be lower than the second nozzle use rate R2.

In the output image IM0 in the overlapping region A3, the third portion IM3, which is continuous from the second region A2 and is not continuous to the first region A1, is lower in the use rate of the first nozzle row 41 than the second portion IM2, which is continuous from the first region A1 and the second region A2. Thus, the difference in the appearance between the third portion IM3 in the overlapping region A3 and the image portion that is continuous from the third portion IM3 in the second region A2 is small. On the other hand, it is unlikely to cause uncomfortable feeling even if there is a difference in appearance between the third portion IM3 in the overlapping region A3 and an image portion in the first region A1 that is not continuous from the third portion IM3. Thus, the above-mentioned aspect can further improve the image quality of the output image in the overlapping region.

Fourth Aspect

As exemplified in FIGS. 3 and 9 and the like, the third portion control section U3 may form the third portion IM3 without using the first nozzle row 41. This aspect can further improve the image quality of the output image in the overlapping region.

Fifth Aspect

In addition, as exemplified in FIGS. 13 to 16, the recording control device 1 according to another aspect of the present technology is the recording control device 1 that controls recording on the medium ME1 by the recording head 30 including the nozzle row 33, a plurality of main scans in which the recording head 30 and the medium ME1 relatively move in a main scan direction D1 that intersects the nozzle alignment direction D3 of the nozzle row 33, and a sub scan in which the recording head 30 and the medium ME1 relatively move in a feed direction D2 that intersects the main scan direction D1, and the recording control device 1 includes the first portion control section U1 and the second portion control section U2. The plurality of main scans include a first main scan 61 and a second main scan 62 in which the arrangement of the nozzle row 33 in the feed direction D2 partially overlaps the first main scan 61. Here, in the recording region A0 where recording is performed on the medium ME1 when the first main scan 61 and the second main scan 62 are performed, a region corresponding to a portion 64 where the nozzle row 33 is present during the first main scan and the nozzle row 33 is not present during the second main scan is the first region A1, a region corresponding to an overlapping portion 63 where the nozzle row 33 is present during the first main scan and the second main scan is the overlapping region A3, and a region corresponding to a portion 65 where the nozzle row 33 is present during the second main scan and the nozzle row 33 is not present during the first main scan is the second region A2. With the first portion IM1 set as a portion that is continuous from the first region A1 and is not continuous to the second region A2 in the output image IM0 that is formed on the medium ME1 in the overlapping region A3, the first portion control section U1 forms the first portion IM1 in such a manner that the use rate of the nozzle row 33 during the first main scan in the overlapping portion 43 is set to the first nozzle use rate R1. With the second portion IM2 set as a portion continuous from the first region A1 and the second region A2 in the output image IM0 in the overlapping region A3, the second portion control section U2 forms the second portion IM2 in such a manner that the use rate of the nozzle row 33 during the first main scan in the overlapping portion 43 is set to the second nozzle use rate R2. The first nozzle use rate R1 is higher than the second nozzle use rate R2.

With the second portion IM2 set as a portion continuous from the first region A1 and the second region A2 in the output image IM0 in the overlapping region A3, the second portion control section U2 forms the second portion IM2 in such a manner that the use rate of the nozzle row 33 during the first main scan in the overlapping portion 43 is set to the second nozzle use rate R2. Thus, the difference in the appearance between the first portion IM1 in the overlapping region A3 and an image portion continuous from the first portion IM1 in the first region A1 is small. On the other hand, it is unlikely to cause uncomfortable feeling even if there is a difference in appearance between the first portion IM1 in the overlapping region A3 and an image portion in the second region A2 that is not continuous from the first portion IM1. Thus, the above-mentioned aspect can provide a recording control device that can improve the image quality of the output image in the overlapping region corresponding to the overlapping portion where the nozzle row is present during the first main scan and the second main scan in the recording region.

Again, the nozzle row means a plurality of aligned nozzles used for the recording, and does not include an end nozzle that is not used for the recording.

The relative movement of the recording head and the medium includes a movement of the medium with no movement of the recording head, a movement of the recording head with no movement of the medium, and a movement of both the recording head and the medium.

The main scan direction may be orthogonal to the nozzle alignment direction, or may obliquely intersect the nozzle alignment direction without being orthogonal to the nozzle alignment direction.

The feed direction may be orthogonal to the main scan direction, or may obliquely intersect the main scan direction without being orthogonal to the main scan direction.

Note that the above-described notes apply also to the following aspects.

Additional Aspect 1 of Fifth Aspect

The first portion control section U1 may form the first portion IM1 without using the nozzle row 33 during the second main scan. This aspect can further improve the image quality of the output image in the overlapping region.

Additional Aspect 2 of Fifth Aspect

With the third portion IM3 set as a portion that is continuous from the second region A2 and is not continuous to the first region A1 in the output image IM0 in the overlapping region A3, the recording control device 1 may further include the third portion control section U3 that forms the third portion IM3 in such a manner that the use rate of the nozzle row 33 during the first main scan in the overlapping portion 43 is set to the third nozzle use rate R3. The third nozzle use rate R3 may be lower than the second nozzle use rate R2.

In the output image IM0 in the overlapping region A3, the third portion IM3, which is continuous from the second region A2 and is not continuous to the first region A1, is lower in the use rate of the nozzle row 33 during the first main scan than the second portion IM2, which is continuous from the first region A1 and the second region A2. Thus, the difference in the appearance between the third portion IM3 in the overlapping region A3 and the image portion that is continuous from the third portion IM3 in the second region A2 is small. On the other hand, it is unlikely to cause uncomfortable feeling even if there is a difference in appearance between the third portion IM3 in the overlapping region A3 and an image portion in the first region A1 that is not continuous from the third portion IM3. Thus, the above-mentioned aspect can further improve the image quality of the output image in the overlapping region.

Additional Aspect 3 of Fifth Aspect

The third portion control section U3 may form the third portion IM3 without using the nozzle row 33 during the first main scan. This aspect can further improve the image quality of the output image in the overlapping region.

Sixth Aspect

Figure 6:
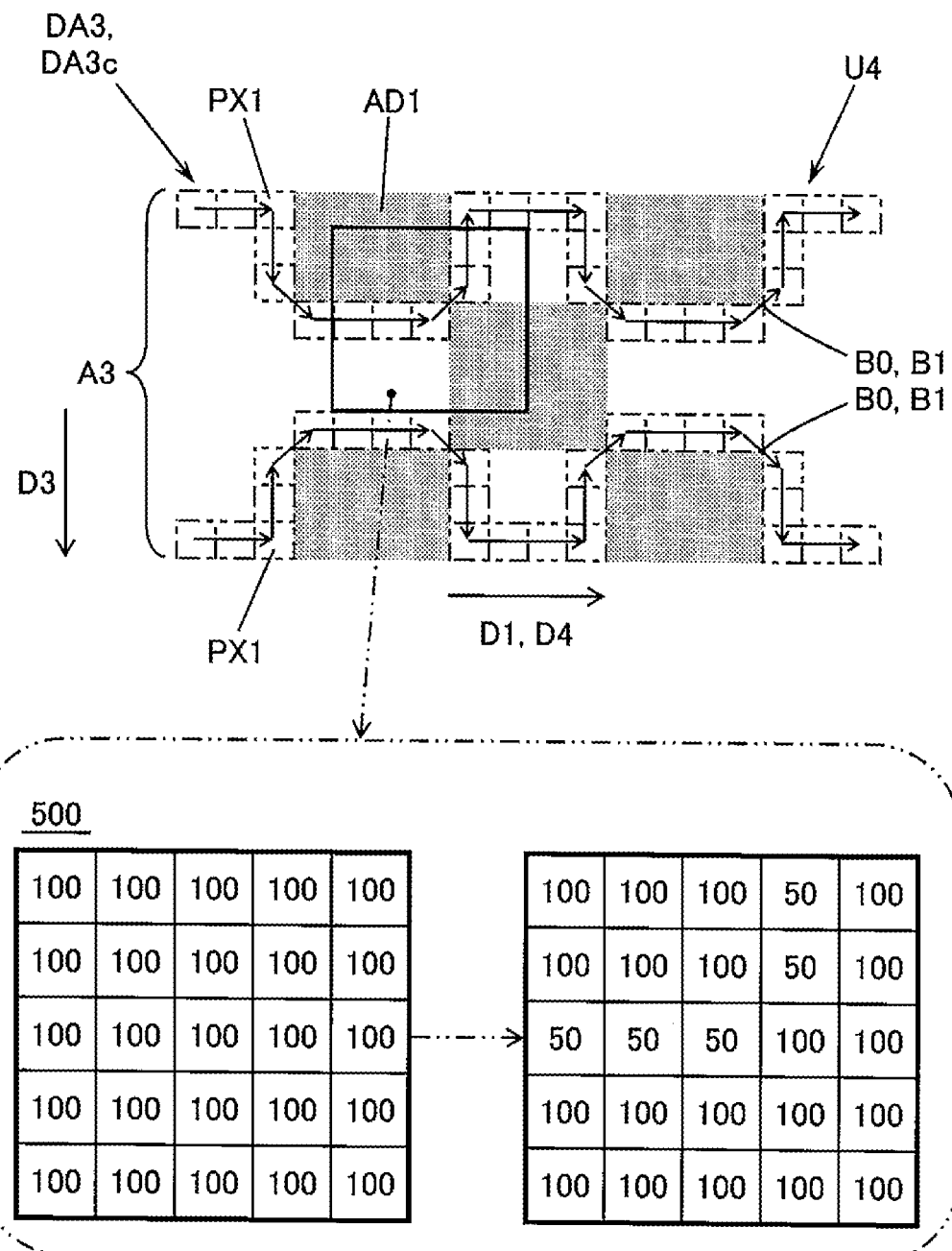
FIG. 6 a drawing schematically illustrating an example of a boundary extraction process in a first output color.
Figure 7:
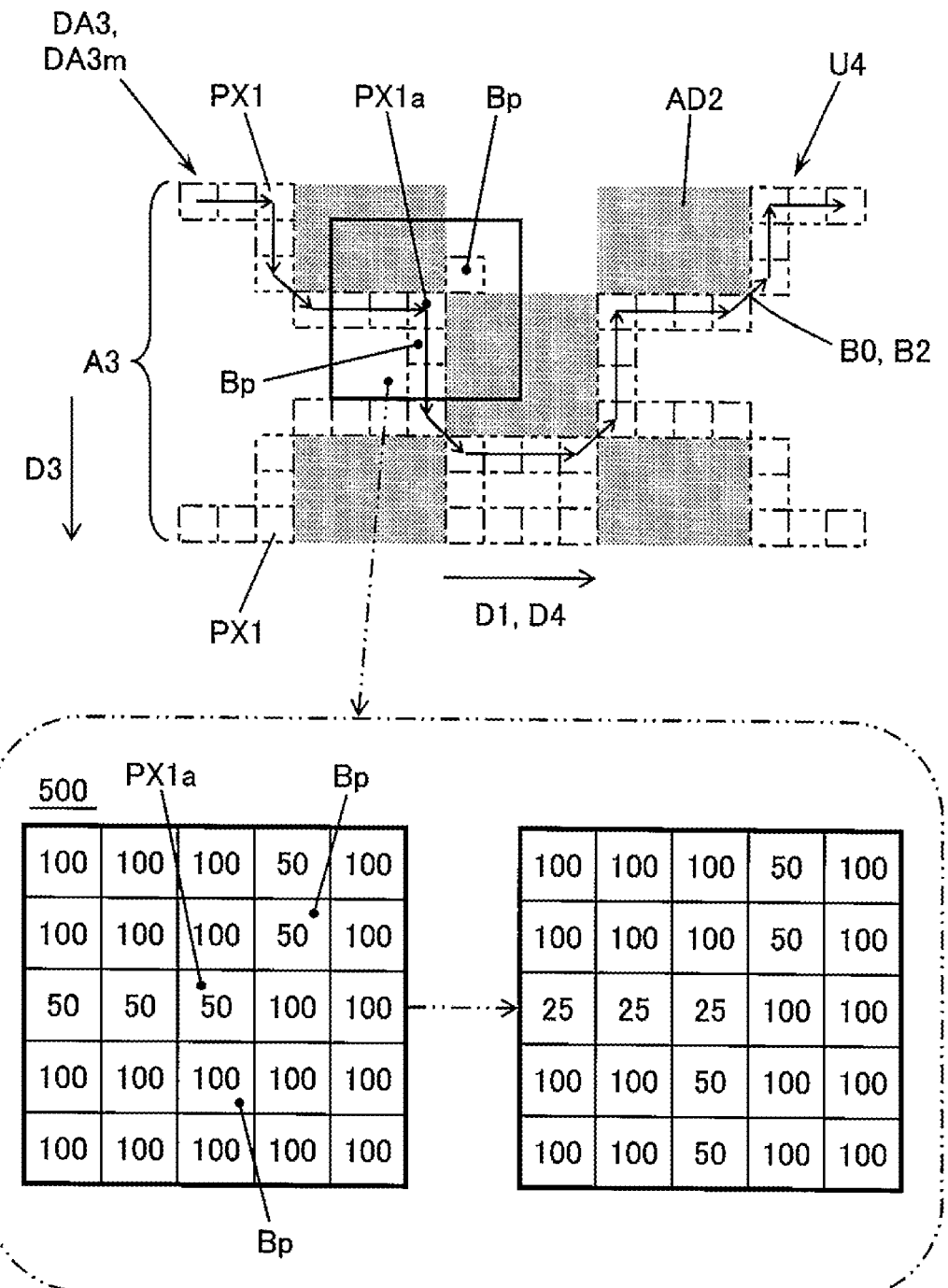
FIG. 7 is a drawing schematically illustrating an example of a boundary extraction process in a second output color.

As exemplified in FIGS. 6 and 7 and the like, the present recording control device 1 may further include a boundary extraction section U4 that extracts a non-continuous boundary B0 present in the output image IM0 in the overlapping region A3 on the basis of image data (for example, any of data DA1, DA2 and DA3) corresponding to the output image IM0. The first portion control section U1 may form the first portion IM1 in accordance with the boundary B0 in the overlapping region A3, with the first portion IM1 set as a portion continuous from the first region A1 and is not continuous to the second region A2 in the output image IM0. The second portion control section U2 may form the second portion IM2 in accordance with the boundary B0 in the overlapping region A3, with the second portion IM2 set as a portion continuous from the first region A1 and the second region A2 in the output image IM0. In the present aspect, each portion of the output image IM0 is formed in accordance with the non-continuous boundary B0 present in the output image IM0 in the overlapping region A3, and thus the image quality of the output image in the overlapping region can be further improved.

Seventh Aspect

As exemplified in FIGS. 6, 7, 11 and 12 and the like, the boundary extraction section U4 may extract at least one of a blank portion (for example, a blank pixel PX1) and an edge portion (for example, an edge pixel PX2) as the boundary B0 present in the output image IM0 in the overlapping region A3 on the basis of the image data. Since the blank portion (PX1) and the edge portion (PX2) are preferable as the boundary B0, the image quality of the output image in the overlapping region can be further improved.

Eighth Aspect

The output image IM0 may include dots DT0 of a plurality of output colors (for example, cyan, magenta, yellow, and black). The image data may include halftone data DA3 that represents the formation state of the dot DT0 for each of the plurality of output colors. The boundary extraction section U4 may extract a pixel (PX1) where the dot DT0 is not formed, as the blank portion present in the output image IM0 in the overlapping region A3 for each of the plurality of output colors, on the basis of the halftone data DA3. The present aspect can provide a preferable example in which a blank portion present in the output image in the overlapping region is extracted.

Ninth Aspect

As exemplified in FIG. 1 and the like, the image data may include gradation data DA5 with a larger number of gradations than the halftone data DA3 that represents the formation state of the dot DT0. As exemplified in FIGS. 11 and 12 and the like, the boundary extraction section U4 may extract an edge portion (PX2) present in the output image IM0 in the overlapping region A3 on the basis of the gradation data DA5. The present aspect can provide a preferable example in which an edge portion present in the output image in the overlapping region is extracted.

Tenth Aspect

The plurality of output colors may include a first output color (in the example illustrated in FIG. 6, cyan), and a second output color (in the example illustrated in FIG. 7, magenta). For the first output color, the boundary extraction section U4 may extract a first boundary B1 on the basis of the image data, with the first boundary B1 set as the boundary B0 present in the output image IM0 in the overlapping region A3. For the second output color, the boundary extraction section U4 may extract a second boundary B2 on the basis of the image data, with the second boundary B2 set as a candidate different from the first boundary B1 in a plurality of candidates Bp of the boundary B0 present in the output image IM0 in the overlapping region A3. In the present aspect, the extraction is performed in such a manner that the boundary (B1) for the first output color and the boundary (B2) for the second output color are different from each other, and thus the difference in the appearance between the overlapping region A3 and the non-overlapping regions A1 and A2 is further less recognized. Thus, the present aspect can further improve the image quality of the output image in the overlapping region.

Eleventh Aspect

Incidentally, a recording control method according to an aspect of the present technology includes a first portion control step ST1 corresponding to the first portion control section U1 of the above-mentioned first aspect, and a second portion control step ST2 corresponding to the second portion control section U2 of the above-mentioned first aspect. The present aspect can provide a recording control method that improves the image quality of the output image in the overlapping region corresponding to an overlapping portion where the first nozzle row and the second nozzle row overlap each other in the nozzle alignment direction in the recording region. The present recording control method may further include a third portion control step ST3 corresponding to the third portion control section U3 of the above-mentioned third aspect, and may further include a boundary extraction step ST4 corresponding to the boundary extraction section U4.

Twelfth Aspect

In addition, a recording control method according to another aspect of the present technology includes the first portion control step ST1 corresponding to the first portion control section U1 of the above-mentioned fifth aspect, and the second portion control step ST2 corresponding to the second portion control section U2 of the above-mentioned fifth aspect. The present aspect can provide a recording control device that improves the image quality of the output image in the overlapping region corresponding to the overlapping portion where the nozzle row 33 is present during the first main scan and the second main scan in the recording region A0. The present recording control method may further include the third portion control step ST3 corresponding to the third portion control section U3 of the additional aspect 2 of the above-mentioned fifth aspect, and may further include the boundary extraction step ST4 corresponding to the boundary extraction section U4.

Further, the present technology is applicable to a recording system including the above-described recording control device, a control method of the recording system, a recording control program, a control program of the above-described recording system, a computer-readable medium in which any of the above-described control programs is recorded, and the like. In addition, the above-described recording control device may be composed of a plurality of separate parts.

(2) Specific Example of Recording System Including Recording Control Device

FIG. 1 schematically exemplifies a recording system SY1 including the recording control device 1. The recording system SY1 illustrated in FIG. 1 includes a host device HO1 and a recording device 2. While the recording control device 1 is included in the recording device 2 in the example illustrated in FIG. 1, the recording control device may be included in the host device HO1, or may be included in both the recording device 2 and the host device HO1. Note that the recording system SY1 may include an additional element not illustrated in FIG. 1, and the recording device 2 may include an additional element not illustrated in FIG. 1.

FIG. 1 illustrates, as the recording device 2, a serial printer, which is a type of inkjet printer. The recording device 2 includes a controller 10, a RAM 21, a communication I/F 22, the recording head 30, a driving section 50, and the like. Here, RAM is an abbreviation for Random Access Memory, and I/F is an abbreviation for interface. The controller 10, the RAM 21, and the communication I/F 22 are connected to a bus, and can mutually exchange information. The recording device 2 including the controller 10 and the RAM 21 includes the first portion control section U1, the second portion control section U2, the third portion control section U3, and the boundary extraction section U4.

The controller 10 includes a CPU 11, a resolution conversion section 12, a color conversion section 13, a halftone processing section 14, a nozzle assignment section 15, a drive signal transmission section 16, and the like. CPU is an abbreviation for Central Processing Unit. The controller 10 controls the main scan and sub scan by the driving section 50 and discharging of a droplet 37 by the recording head 30 on the basis of image data corresponding to the output image IM0. The main scan means a relative movement of the recording head 30 and the medium ME1 in the main scan direction, the sub scan means a relative movement of the recording head 30 and the medium ME1 in the feed direction D2, and the discharging of the droplet 37 by the recording head 30 means recording on the medium ME1 by the recording head 30. The controller 10 may be composed of an SoC or the like. SoC is an abbreviation for System on a Chip.

The CPU 11 is a device that mainly performs information processing and control in the recording device 2.

The resolution conversion section 12 converts the resolution of an input image from the host device HO1 and the like into a set resolution. The input image is represented by, for example, original RGB data with multi-gradation integer values of R, G, and B for each pixel. Here, R means red, G means green, and B means blue. The resolution conversion section 12 converts the original RGB data into input color gradation data DA1 of a set resolution. The input color gradation data DA1 is represented, for example, by RGB data with multi-gradation integer values of R, G, and B for each pixel. The number of gradations of the RGB data and the original RGB data is $2^8$, $2^{16}$ and the like.

The color conversion section 13 converts the input color gradation data DA1 into output color gradation data DA2 that has multi-gradation integer values of C, M, Y and K for each pixel with reference to a color conversion look-up table that defines the correspondence between each gradation value of R, G, and B and each gradation value of C, M, Y and K, for example. Here, C means cyan, M means magenta, Y means yellow, and K means black. The number of gradations of the output color gradation data DA2 is $2^8$, $2^{16}$ and the like. The output color gradation data DA2 represents the use amount of liquid 36 for each pixel.

The halftone processing section 14 generates the halftone data DA3 by reducing the number of gradations of the gradation value by performing a predetermined halftone process such as a dither method, an error diffusion method and a density pattern method for the gradation value of each pixel that constitutes the output color gradation data DA2. The halftone data DA3 represents a formation state of dots. The halftone data DA3 may be binary data that represents whether to form dots, multi-level data of three or more levels that can be used for different sizes of dots, such as small, medium, and large dots. Binary data may be data in which 1 corresponds to dot formation and 0 to no dot formation, for example. Four-valued data that can express each pixel in two bits may be data in which 3 corresponds to large dot formation, 2 to medium dot formation, 1 to small dot formation, and 0 to no dot, for example.

The nozzle assignment section 15 generates nozzle data DA4 by performing a nozzle assignment process of sorting the halftone data DA3 in the order of the dot formation at a driving section 50. A nozzle assignment process in a serial printer is also called a rasterization process. The first portion control section U1, the second portion control section U2, and the third portion control section U3 are mainly implemented by the nozzle assignment section 15.

The driving signal transmission section 16 generates, from the nozzle data DA4, a driving signal SG corresponding to a voltage signal to be applied to a driving element 32 of the recording head 30, and outputs it to a driving circuit 31. For example, when the nozzle data DA4 is "dot formation", the driving signal transmission section 16 outputs a driving signal for discharging droplets for dot formation. In addition, in the case where the nozzle data DA4 is four-valued data, the driving signal transmission section 16 outputs a driving signal for discharging droplets for large dots when the nozzle data DA4 is "large dot formation", outputs a driving signal for discharging droplets for medium dots when the nozzle data DA4 is "medium dot formation", and outputs a driving signal for discharging droplets for small dots when the nozzle data DA4 is "small dot formation".

Each of the above-mentioned parts 11 to 16 may be composed of an ASIC, may directly read data to be processed from the RAM 21, and may directly write processed data in the RAM 21. Here, ASIC is an abbreviation for Application Specific Integrated Circuit.

The driving section 50, which is controlled by the controller 10, includes a carriage driving section 51, a carriage 52, a roller driving section 55, a conveyance roller pair 56, a sheet ejection roller pair 57, a platen 58, and the like. The driving section 50 moves the carriage 52 and the recording head 30 back and forth through driving of the carriage driving section 51, and sends the medium ME1 along a conveyance path 59 in the feed direction D2 through driving of the roller driving section 55. In FIG. 1, the feed direction D2 is the right direction, and the left side and right side are referred to as the upstream side and downstream side, respectively. Under the control of the controller 10, the carriage driving section 51 performs a main scan for moving the carriage 52 and the recording head 30 in the main scan direction D1 illustrated in FIGS. 2 and 13 and the like. The roller driving section 55 performs a sub scan for sending the medium ME1 in the feed direction D2 by rotating rollers 56a and 57a of the roller pairs 56 and 57 under the control of the controller 10. The medium ME1 is a material that retains a printing image, and may be resin, metal, and the like while it is typically paper. While the shape of the medium ME1 is typically a rectangular shape or a roll shape, the shape may be an ellipse shape, a polygonal shape other than a rectangular shape, a three-dimensional shape, or the like.

Figure 13:
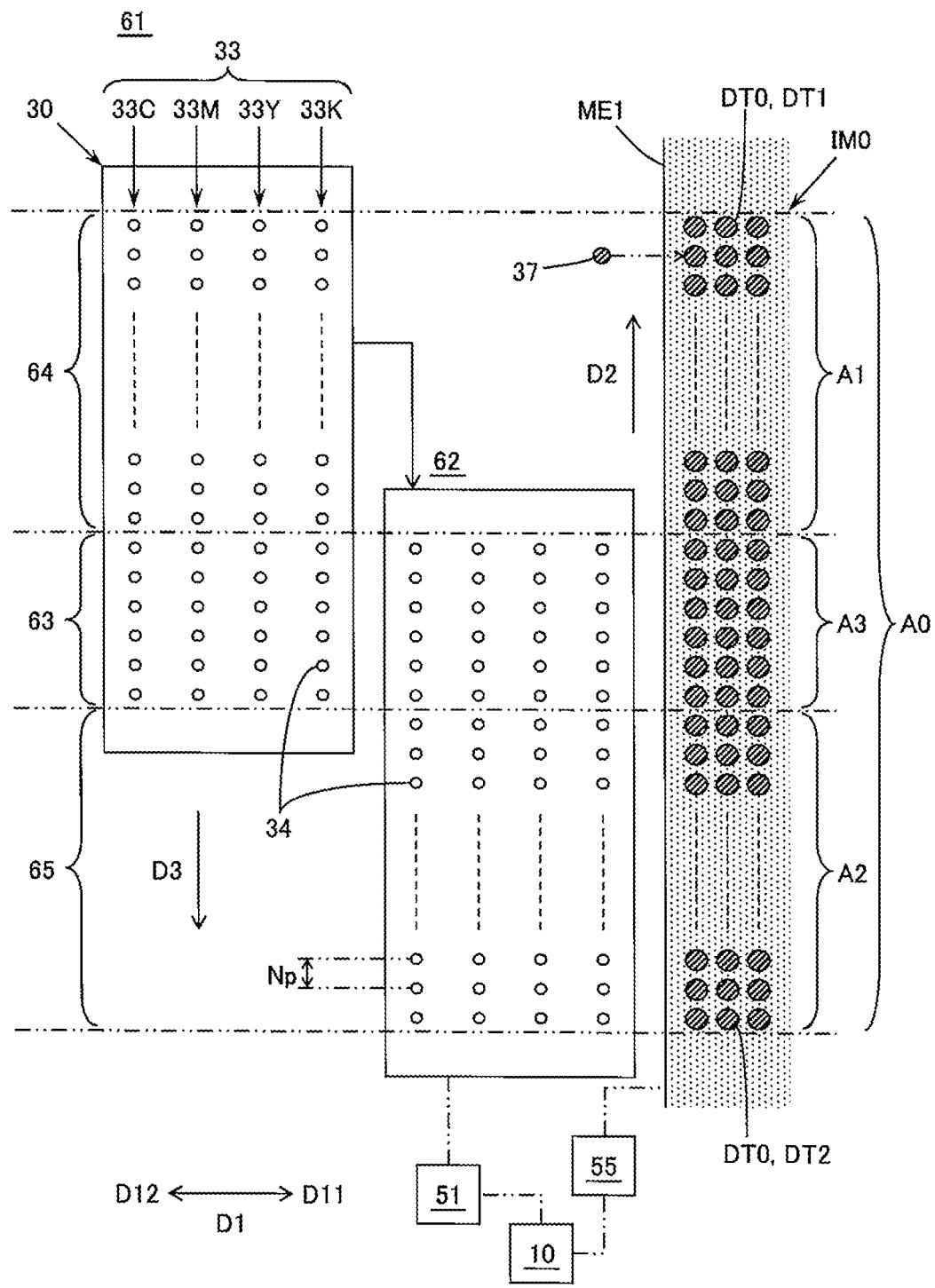
FIG. 13 is a drawing schematically illustrating an example of a correspondence relationship between a nozzle row of a recording head and a recording region in two main scans.

The recording head 30 is mounted in the carriage 52. In the carriage 52, a liquid cartridge 35 for supplying the recording head 30 with the liquid 36 to be discharged as the droplet 37 may be mounted. Naturally, the liquid 36 may be supplied to the recording head 30 through a tube from the liquid cartridge 35 installed outside the carriage 52. The carriage 52 in which the recording head 30 is mounted is fixed to an endless belt not illustrated in the drawing, and can move along a guide 53 in the main scan direction D1 illustrated in FIGS. 2 and 13 and the like. As illustrated in FIG. 13, the main scan direction D1 is a collective term of a forward direction D11 and a backward direction D12 opposite to the forward direction D11. The guide 53 is a long member whose longitudinal direction is set to the main scan direction D1. The carriage driving section 51 is composed of a servomotor, and moves the carriage 52 in the forward direction D11 and the backward direction D12 in accordance with a command from the controller 10.

The conveyance roller pair 56 located upstream of the recording head 30 includes a drive conveyance roller 56a that makes contact with one surface of the medium ME1, and a driven conveyance roller 56b that makes contact with the other surface of the medium ME1. During the sub scan, the conveyance roller pair 56 sends the medium ME1 nipped therebetween toward the recording head 30 through rotation of the drive conveyance roller 56a.

The sheet ejection roller pair 57 located downstream of the recording head 30 includes a drive sheet ejection roller 57a that makes contact with one surface of the medium ME1, and a driven sheet ejection roller 57b that makes contact with the other surface of the medium ME1. During the sub scan, the sheet ejection roller pair 57 conveys the medium ME1 nipped therebetween toward a sheet tray not illustrated in the drawing through rotation of the drive sheet ejection roller 57a.

The roller driving section 55 is composed of a servomotor, and rotates the rollers 56a and 57a in accordance with a command from the controller 10. The rollers 56a and 57a send the medium ME1 in the feed direction D2 through rotation.

The platen 58 supports the medium ME1 located on the conveyance path 59. The recording head 30 under the control of the controller 10 performs printing by discharging the droplet 37 to the medium ME1 supported by the platen 58. The recording head 30 includes the driving circuit 31, the driving element 32, and the like. The driving circuit 31 applies a voltage signal to the driving element 32 in accordance with the driving signal SG input from the driving signal transmission section 16. As the driving element 32, a piezoelectric element that pressurize the liquid 36 in a pressure chamber communicated with a nozzle 34, a driving element that generates bubbles in the pressure chamber using heat and discharges the droplet 37 from the nozzle 34, and the like may be used. The nozzle is a small hole for jetting the droplets 37 such as ink drops. The liquid 36 is supplied to the pressure chamber of the recording head 30 from the liquid cartridge 35 such as an ink cartridge. The combination of the liquid cartridge 35 and the recording head 30 is provided for each of C, M, Y and K, for example. The liquid 36 in the pressure chamber is discharged as the droplet 37 by the driving element 32 from the nozzle 34 toward the medium ME1. In this manner, dots of the droplet 37 are formed on the medium ME1. Dots corresponding to the nozzle data DA4 are formed while the recording head 30 moves in the main scan direction D1, and the output image IM0 is formed on the medium ME1 by repeating sending of the medium ME1 in the conveyance direction for a single sub scan.

The RAM 21 is a volatile semiconductor memory with a large-capacity, and stores an input image and the like received from the host device HO1, a memory not illustrated in the drawing and the like. The communication I/F22, which is connected to the host device HO1 in a wired or wireless manner, inputs/outputs information to/from the host device HO1. The host device HO1 includes a computer such as a personal computer and a tablet terminal, a mobile phone such as a smartphone, a digital camera, a digital video camcorder, and the like.

As the recording device, there is a line-type recording device, such as a line printer, in which a long recording head disposed over the entire width of the medium ME1 and the medium ME1 relatively move in the feed direction D2. In the line printer, the recording head does not move, and recording is performed while the medium ME1 moves in the feed direction D2. A recording head of a line-type recording device includes a plurality of chips CH1 and CH2 in which the nozzle rows 33 are disposed to partially overlap each other in the nozzle alignment direction D3, as in the recording head 30 illustrated in FIG. 2. While the recording head 30 illustrated in FIG. 2 includes two chips CH1 and CH2, the recording head 30 may include three or more chips. In the case where the recording head 30 includes three or more chips, two chips adjacent to each other in the nozzle alignment direction D3 in three or more chips are applied to the present technology as the chips CH1 and CH2.

Figure 2:
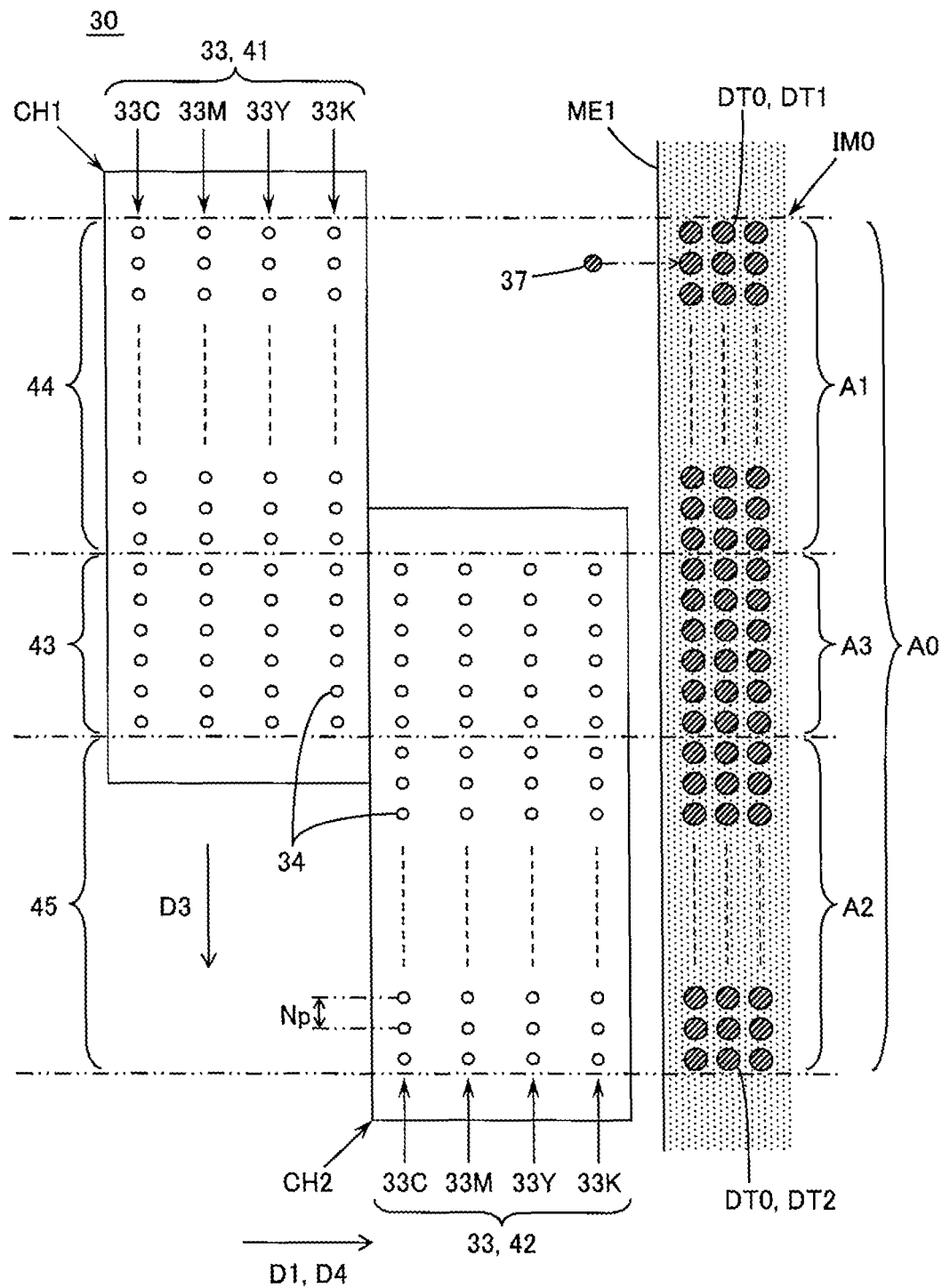
FIG. 2 is a drawing schematically illustrating an example of a correspondence relationship between a plurality of nozzle rows of a recording head and a recording region.

FIG. 2 schematically exemplifies a correspondence relationship between the plurality of nozzle rows 33 of the recording head 30 and the recording region A0. As illustrated in FIG. 2, the recording head 30 including the plurality of chips CH1 and CH2 may be used for a line-type recording device, or may be applied to a serial-type recording device, such as a serial printer, that repeats a main scan and a sub scan. A serial printer repeats the main scan for moving the recording head 30 in the main scan direction D1 and the sub scan for moving the medium ME1 in the feed direction D2. In the case of a serial-type recording device, the main scan direction D1 is the relative movement direction D4 in which the recording head 30 and the medium ME1 relatively move.

Each of the chips CH1 and CH2 includes the nozzle row 33 in which a plurality of the nozzles 34 is disposed side by side in the nozzle alignment direction D3 at a nozzle pitch Np. The nozzle alignment direction D3 and the relative movement direction D4 may be orthogonal to each other, or may be obliquely intersect each other without being orthogonal to each other. In a case of a serial-type recording device, the nozzle alignment direction D3 may coincide with the feed direction D2 illustrated in FIG. 4 and the like, or may be shifted from the feed direction D2 in a range smaller than 90°. In addition, while the plurality of the nozzles 34 included in the nozzle row 33 illustrated in FIG. 2 is arranged in a line, a plurality of nozzles included in a nozzle row may be arranged in a staggered manner. Each of the chips CH1 and CH2 illustrated in FIG. 2 includes, as the nozzle row 33, the nozzle row 33C of C, the nozzle row 33M of M, the nozzle row 33Y of Y, and the nozzle row 33K of K. Naturally, the nozzle 34 included in the nozzle row 33C discharges the droplet 37 of C, the nozzle 34 included in the nozzle row 33M discharges the droplet 37 of M, the nozzle 34 included in the nozzle row 33Y discharges the droplet 37 of Y, and the nozzle 34 included in the nozzle row 33K discharges the droplet 37 of K.

Here, the nozzle row 33 of the first chip CH1 corresponds to the first nozzle row 41, and the nozzle row 33 of the second chip CH2 corresponds to the second nozzle row 42. The first nozzle row 41 and the second nozzle row 42 partially overlap each other in the nozzle alignment direction D3. In the recording head 30, the portion where the first nozzle row 41 and the second nozzle row 42 overlap each other is referred to as the overlapping portion 43, a second nozzle row non-present portion where the first nozzle row 41 is present and the second nozzle row 42 is not present is referred to as the portion 44, and a first nozzle row non-present portion where the second nozzle row 42 is present and the first nozzle row 41 is not present is referred to as the portion 45.

Note that since which of the plurality of chips corresponds to the nozzle rows 41 and 42 is determined relative to each other, the nozzle row 33 of the second chip CH2 may correspond to the first nozzle row 41 and the nozzle row 33 of the first chip CH1 may correspond to the second nozzle row 42.

When the recording head 30 discharges the droplet 37 to the medium ME1 while the recording head 30 and the medium ME1 relatively move in the relative movement direction D4, the dot DT0 composed of the droplet 37 is formed on the medium ME1. In the case where the liquid 36 discharged as the droplet 37 includes a plurality of output colors, for example, output colors of C, M, Y and K, the output image IM0 includes the dots DT0 of the plurality of output colors. The dot DT0 is a collective term of a first dot DT1 formed by the droplet 37 discharged from the first nozzle row 41, and a second dot DT2 formed by the droplet 37 discharged from the second nozzle row 42. Here, the region that is recorded on the medium ME1 when the relative movement of the recording head 30 and the medium ME1 is performed is referred to as the recording region A0. The recording region A0 includes the first region A1 where the first dot DT1 is formed by the droplet 37 discharged from the second nozzle row non-present portion 44 of the recording head 30, the overlapping region A3 where the dot DT0 is formed by the droplet 37 discharged from the overlapping portion 43 of the recording head 30, and the second region A2 where the second dot DT2 is formed by the droplet 37 discharged from the first nozzle row non-present portion 45 of the recording head 30. The first region A1 is a region corresponding to the portion 44 where the first nozzle row 41 is present and the second nozzle row 42 is not present in the recording region A0. The overlapping region A3 is a region corresponding to the overlapping portion 43 where the first nozzle row 41 and the second nozzle row 42 overlap each other in the recording region A0. The second region A2 is a region corresponding to the portion 45 where the second nozzle row 42 is present and the first nozzle row 41 is not present in the recording region A0. When the dot DT0 is repeatedly formed on the medium ME1, the output image IM0 is formed on the medium ME1.

Note that in the case of a serial-type recording device, all dots DT0 are formed in a single main scan in the recording region A0. In the case of a line printer, all dots DT0 are formed in the recording region A0 when the medium ME1 passes through the vicinity of the recording head 30.

FIG. 3 schematically exemplifies the output image IM0 formed in the recording region A0 together with the recording head 30. In FIG. 3, for the sake of clarity of illustration, only any one of C, M, Y and K is illustrated as the first nozzle row 41 of the first chip CH1 and the second nozzle row 42 of the second chip CH2. In addition, while the number of pixels in the overlapping region A3 in the nozzle alignment direction D3 is ten in FIG. 3, the number of pixels may be 11 or greater, or nine or smaller.

The output image IM0 formed on the medium ME1 in the overlapping region A3 may include the first portion IM1, which is continuous from the first region A1 and is not continuous to the second region A2, the second portion IM2, which is continuous from the first region A1 and the second region A2, and the third portion IM3, which is continuous from the second region A2 and is not continuous to the first region A1. Here, the state where the first portion IM1 is not continuous from the second region A2 means that the non-continuous boundary B0 present in the output image IM0 in the overlapping region A3 is present between the first portion IM1 and the second region A2. The state where the first portion IM1 is continuous from the first region A1 means that the non-continuous boundary B0 present in the output image IM0 in the overlapping region A3 does not separate the first portion IM1 and the first region A1. The state where the second portion IM2 is continuous from the first region A1 and the second region A2 means that the non-continuous boundary B0 present in the output image IM0 in the overlapping region A3 does not separate the second portion IM2 and the first region A1 and does not separate the second portion IM2 and the second region A2. The state where the third portion IM3 is not continuous from the first region A1 means that the non-continuous boundary B0 present in the output image IM0 in the overlapping region A3 is present between the third portion IM3 and the first region A1. The state where the third portion IM3 is continuous from the second region A2 means that the non-continuous boundary B0 present in the output image IM0 in the overlapping region A3 does not separate the third portion IM3 and the second region A2.

Note that the non-continuous boundary B0 can be represented by a connection of boundary pixels PX0 present in the output image IM0. The boundary pixel PX0 includes the blank pixel PX1 where the dot DT0 is not formed, the edge pixel PX2 whose multi-gradation pixel value is largely different from that of the adjacent pixel, and the like. The blank pixel PX1 is an example of a blank portion, and the edge pixel PX2 is an example of an edge portion.

As the boundary extraction section U4 illustrated in FIG. 1, the controller 10 extracts the non-continuous boundary B0 present in the output image IM0 in the overlapping region A3 on the basis of image data corresponding to the output image IM0. The boundary B0 defines the first portion IM1, the second portion IM2, and the third portion IM3 from the output image IM0 in the overlapping region A3. As the first portion control section U1 illustrated in FIG. 1, the controller 10 performs a control of forming the first portion IM1 in such a manner that the use rate of the first nozzle row 41 of the overlapping portion 43 is set to the first nozzle use rate R1. In addition, as the second portion control section U2 illustrated in FIG. 1, the controller 10 performs a control of forming the second portion IM2 in such a manner that the use rate of the first nozzle row 41 of the overlapping portion 43 is set to the second nozzle use rate R2. Further, as the third portion control section U3 illustrated in FIG. 1, the controller 10 performs a control of forming the third portion IM3 in such a manner that the use rate of the first nozzle row 41 of the overlapping portion 43 is set to the third nozzle use rate R3.

Here, regarding one scan line RA1 along the relative movement direction D4 in the overlapping region A3, nozzles for forming the dots DT0 on the scan line RA1 in the nozzle rows 41 and 42 are set as nozzles 34a and 34b, respectively. In addition, in the plurality of pixels included in the scan line RA1, the number of the pixels assigned to the nozzle 34a for forming the first dot DT1 is represented by Npx1, and the number of the pixels assigned to the nozzle 34b for forming the second dot DT2 is represented by Npx2. The use rates R1, R2 and R3 of the first nozzle row 41 of the overlapping portion 43 are represented as follows.

{Npx1/(Npx1+Npx2)}×100%

A feature of the present specific example is that the use rates R1, R2 and R3 of the first nozzle row 41 of the overlapping portion 43 are changed in accordance with the portions IM1, IM2 and IM3 included in the output image IM0 in the overlapping region A3. The first nozzle use rate R1 is higher than the second nozzle use rate R2. The third nozzle use rate R3 is lower than the second nozzle use rate R2. In the illustration of FIGS. 3, R1=100%, R3=0%, and R3<R2<R1 hold.

Note that in the output image IM0 in the overlapping region A3, an independent portion that is not continuous from the first region A1 or the second region A2 may be present. The use rate of the first nozzle row 41 in the independent portion is preferably the second nozzle use rate R2, but may be the first nozzle use rate R1, or the third nozzle use rate R3.

Figure 17:
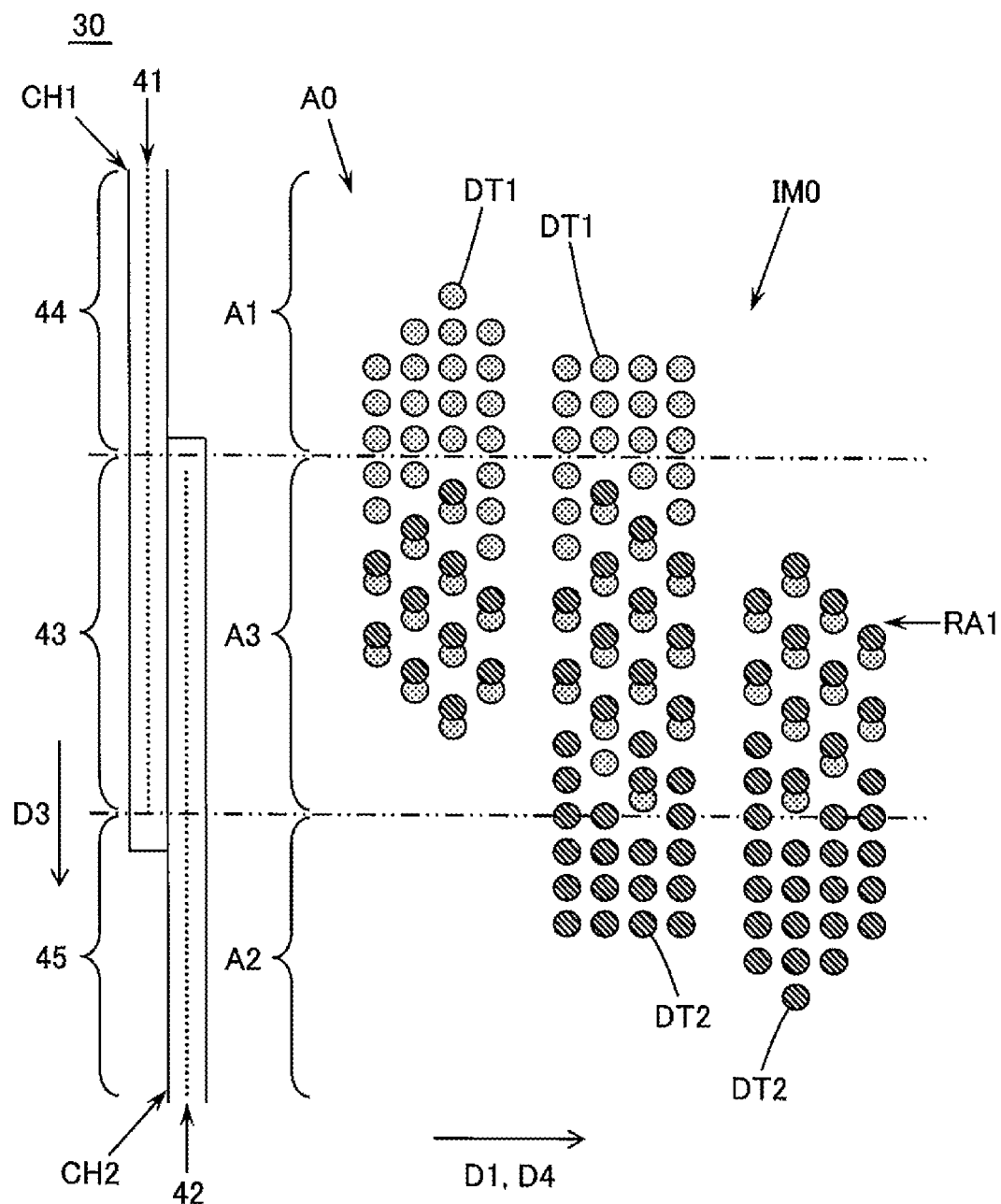
FIG. 17 is a drawing schematically illustrating an example of a state where the appearance is different between an overlapping region and a non-overlapping region in a comparative example.

FIG. 17 schematically illustrates a comparative example in which the use rate of the first nozzle row 41 of the overlapping portion 43 are the same regardless of the portions included in the output image IM0. FIG. 17 schematically illustrates, as an example in which the appearance differs between the overlapping region A3 and the non-overlapping regions A1 and A2, the output image IM0 that is formed in the recording region A0 in a case where there is a shift in the relative dot formation position of the nozzle rows 41 and 42 due to a shift in the relative position between the first nozzle row 41 and the second nozzle row 42.

As illustrated in FIG. 17, in the case where the recording head 30 including the nozzle rows 41 and 42 partially overlapping each other in the nozzle alignment direction D3 is used, an error of the relative position of the nozzle rows 41 and 42 may be caused. When such an error is caused, the arrangement of dots is different between the first region A1 and the overlapping region A3, and the appearance of the output image IM0 in the first region A1 and the appearance of the output image IM0 in the overlapping region A3 are different from each other. In addition, the arrangement of dots is different also between the second region A2 and the overlapping region A3, and the appearance of the output image IM0 in the second region A2 and the appearance of the output image IM0 in the overlapping region A3 are different from each other. Consequently, a streak extending along the relative movement direction D4 is formed in the overlapping region A3 between the first region A1 and the second region A2. This streak may be a dark streak, or a light streak.

In addition, since the impinging timing of the droplet discharged from the first nozzle row 41 and the impinging timing of the droplet discharged from the second nozzle row 42 are different from each other, a streak extending along the relative movement direction D4 is formed in the overlapping region A3 depending on the properties of the liquid and the medium ME1.

Figure 4:
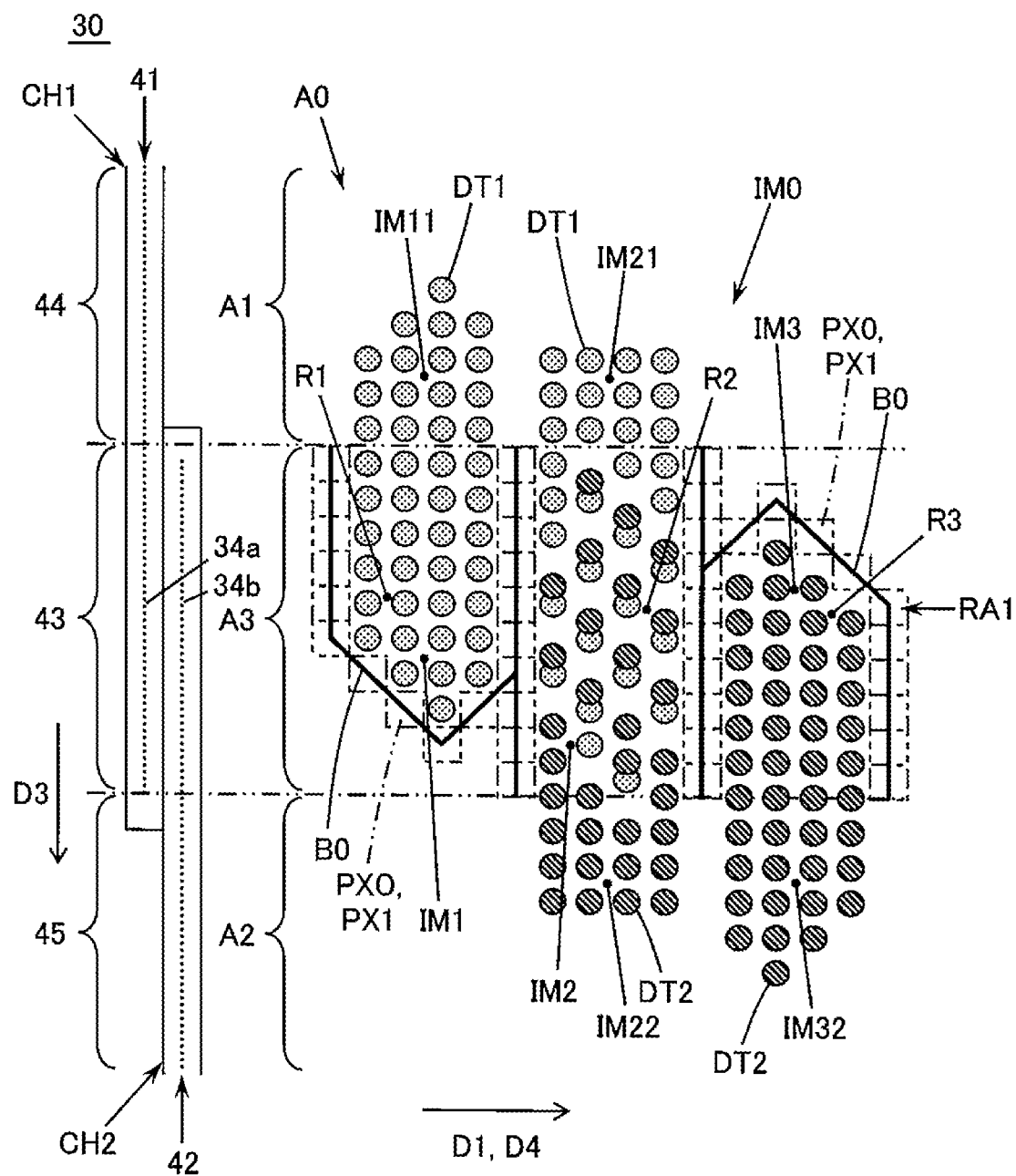
FIG. 4 is a drawing schematically illustrating an example of an output image formed in a recording region in a case where there is a shift in a relative dot formation position of a first nozzle row and a second nozzle row.

On the other hand, as exemplified in FIG. 4, by setting R3<R2<R1 in accordance with the portions IM1, IM2 and IM3 included in the output image IM0, and the image quality of the output image IM0 in the overlapping region A3 is improved. FIG. 4 schematically exemplifies the output image IM0 that is formed in the recording region A0 in a case where there is a shift in the relative dot formation position of the nozzle rows 41 and 42 due to a shift in the relative position between the first nozzle row 41 and the second nozzle row 42 in the present specific example.

When the first portion IM1 in the overlapping region A3 is formed at R1=100%, the arrangement of dots is the same in an image portion IM11 connected to the first portion IM1 in the first region A1 and the first portion IM1. As a result, the appearance is uniform from the image portion IM11 of the first region A1 to the first portion IM1 of the overlapping region A3. Note that even at R1<100%, in the case of R1>R2, the arrangement of dots in the first portion IM1 is close to the arrangement of dots in the image portion IM11, and the difference in the appearance between the first portion IM1 and the image portion IM11 is less recognized.

When the third portion IM3 in the overlapping region A3 is formed at R1=0%, the arrangement of dots is the same in an image portion IM32 connected to the third portion IM3 in the second region A2 and the third portion IM3. As a result, the appearance is uniform from the image portion IM32 of the second region A2 to the third portion IM3 of the overlapping region A3. Note that even at R3>0%, in the case of R3<R2, the arrangement of dots of the third portion IM3 is close to the arrangement of dots of the image portion IM32, and the difference in the appearance between the third portion IM3 and the image portion IM32 is less recognized.

In the second portion IM2 in the overlapping region A3, the arrangement of dots is different between an image portion IM21 connected to the second portion IM2 in the first region A1 and an image portion IM22 connected to the second portion IM2 in the second region A2. However, in the overlapping region A3, the first portion IM1 appears to be uniform with the image portion IM11 of the first region A1 and the second portion IM2 appears to be uniform with the image portion IM32 of the second region A2, and thus, a streak extending along the relative movement direction D4 is less formed in the overlapping region A3. Thus, the present specific example can improve the image quality of the output image IM0 in the overlapping region A3.

Figure 5:
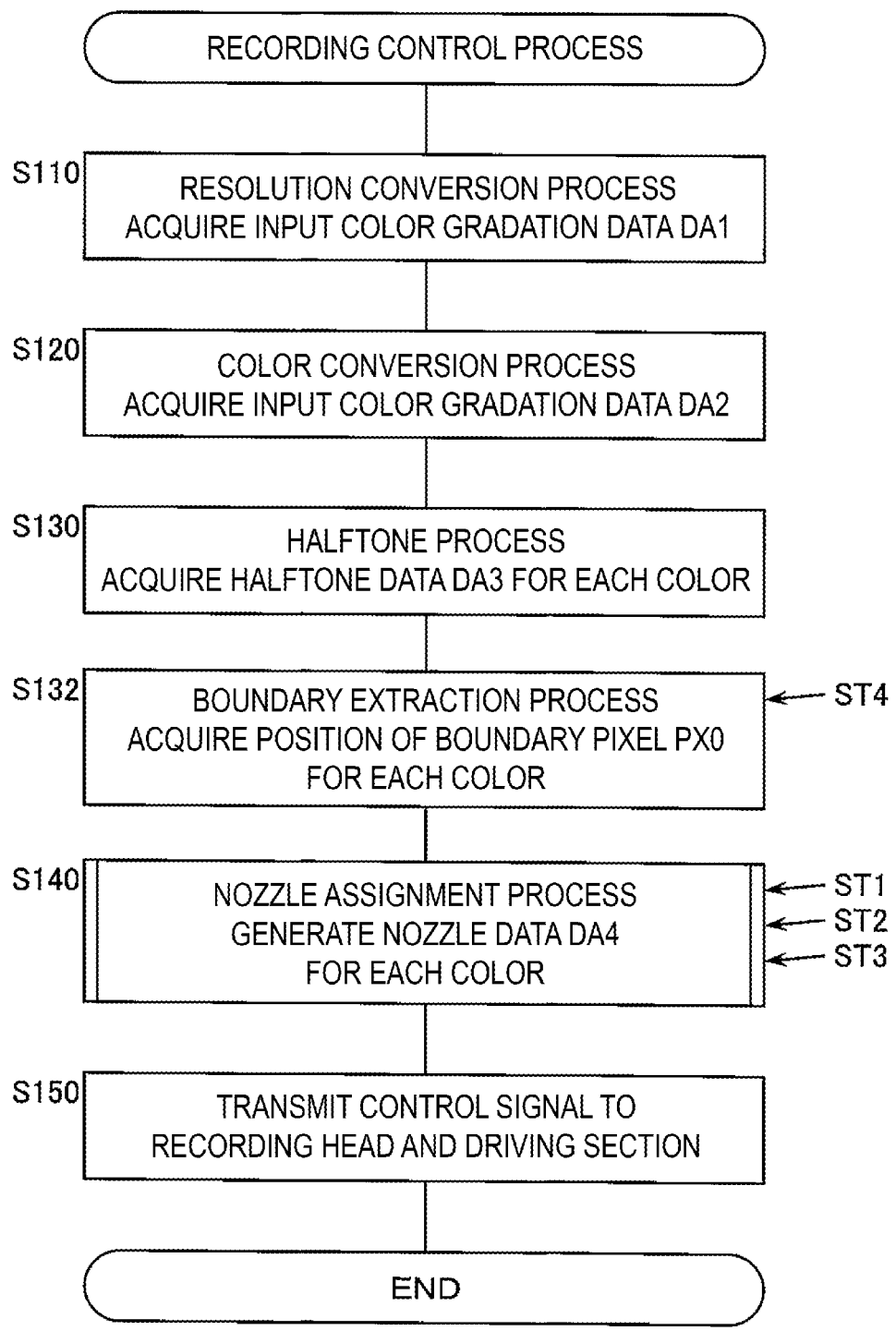
FIG. 5 is a flowchart of an example of a recording control process.

(3) Specific Examples of Recording Control Process Performed in Recording Control Device Next, with reference to FIG. 5 and the like, an example of a recording control process performed in the recording control device 1 is described. FIG. 5 exemplifies a recording control process performed by the controller 10 using the RAM 21. In FIG. 5, step S132 corresponds to the boundary extraction section U4 illustrated in FIG. 1, the boundary extraction step ST4, and a boundary extraction function. Step S140 corresponds to the first portion control section U1, the first portion control step ST1, a first portion control function, the second portion control section U2, the second portion control step ST2, a second portion control function, the third portion control section U3, the third portion control step ST3, and a third portion control function. In the following, the word "step" is omitted, and the reference numeral of the step is given in parentheses.

When the recording control process is started, the controller 10 performs, at the resolution conversion section 12, a resolution conversion process of acquiring the input color gradation data DA1, for example, RGB data of the set resolution on the basis of an input image from the host device HO1 and the like (S110).

After the input color gradation data DA1 is acquired, the controller 10 performs, at the color conversion section 13, a color conversion process of acquiring the output color gradation data DA2, for example, CMYK data on the basis of the input color gradation data DA1 (S120). The color conversion section 13 refers to, for example, a color conversion look-up table and converts the input color gradation data DA1 into the output color gradation data DA2.

After the output color gradation data DA2 is acquired, the controller 10 performs, at the halftone processing section 14, a halftone process of acquiring the halftone data DA3 for each color on the basis of the output color gradation data DA2 (S130). The halftone processing section 14 generates two- or four-valued halftone data DA3 through a halftone process such as a dither method with the multi-gradation output color gradation data DA2 for each color of CMYK, for example. The halftone data DA3 is an example of image data for extracting the boundary B0.

After the halftone data DA3 is acquired, the controller 10 performs, at the nozzle assignment section 15, a boundary extraction process of extracting the non-continuous boundary B0 present in the output image IM0 in the overlapping region A3 on the basis of the halftone data DA3 for each color (S132).

FIGS. 6 and 7 schematically exemplify a state where a connection of the blank pixel PX1, which is an example of the boundary B0, is extracted. The nozzle assignment section 15 of the present specific example performs the boundary extraction process in the order of C as an example of the first output color, M as an example of the second output color, Y, and K. FIG. 6 illustrates a state where a connection of the blank pixel PX1 is extracted for halftone data DA3$c$ of C that is processed first. A dot formation region AD1 illustrated in FIG. 6 is a region where the C dot is formed in the overlapping region A3. The searching order illustrated in FIG. 6 includes an order of searching the blank pixel PX1 in the right direction from the left end pixel adjacent to the first region A1 while bypassing the dot formation region AD1, and an order of searching the blank pixel PX1 in the right direction from the left end pixel adjacent to the second region A2 while bypassing the dot formation region AD1. Naturally, the end portion of the pixel for starting the searching may be the right end pixel, and in that case, the blank pixel PX1 may be searched in the left direction. FIG. 7 illustrates a state where a connection of the blank pixel PX1 is extracted for halftone data DA3$m$ of M that is processed next. A dot formation region AD2 illustrated in FIG. 7 is a region where the M dot is formed in the overlapping region A3. The arrows between the blank pixels PX1 indicate the searching order of the blank pixel PX1.

In the case where the dot formation region AD1 of C has a complicated shape such as a check-pattern in the overlapping region A3 as illustrated in FIG. 6, the boundary B0 has a plurality of candidates. In this case, the boundary B0 may be extracted according to a given rule, or randomly. The boundary B0 of C is an example of the first boundary B1. In the present specific example, the boundary B0 is extracted such that the boundary B0 of each color is different as much as possible. In view of this, the nozzle assignment section 15 uses selection priority information 500 as illustrated in the lower part of FIG. 6. Initially, the selection priority information 500 is a numerical value group in which an initial value 100 is assigned to each pixel of the overlapping region A3. The nozzle assignment section 15 changes, to ½ of the original numerical value, for example, 50, the numerical value corresponding to the pixel determined as the blank pixel PX1 in accordance with the halftone data DA3c of C among the pixels of the overlapping region A3.

In the case where the dot formation region AD2 of M has a complicated shape such as a check-pattern in the overlapping region A3 as illustrated in FIG. 7, the boundary B0 has a plurality of candidates. In this case, the boundary B0 of M may be extracted such that it is different from the first boundary B1 of C as much as possible in accordance with the selection priority information 500. The boundary B0 of M is an example of the second boundary B2. For example, the boundary pixels connected from a blank pixel PX1a illustrated in FIG. 7 include the upper right candidate and the bottom candidate as candidates Bp of the second boundary B2. Here, in the selection priority information 500 illustrated in the lower part of FIG. 7, the numerical value assigned to the upper right candidate Bp is 50 and the numerical value assigned to the bottom candidate Bp is 100, and accordingly, the bottom candidate, which has the larger numerical value, is extracted as the second boundary B2. The nozzle assignment section 15 changes, to ½ of the original numerical value, the numerical value corresponding to the pixel determined as the blank pixel PX1 in accordance with the halftone data DA3m of M among the pixels of the overlapping region A3.

Thereafter, the boundary B0 of Y is extracted based on the updated selection priority information 500, and further the boundary B0 of K is extracted based on the updated selection priority information 500.

In this manner, for M as the second output color, the nozzle assignment section 15 extracts, as the second boundary B2, a candidate different from the first boundary B1 of C as the first output color from among the plurality of candidates Bp of the boundary B0 present in the output image IM0 in the overlapping region A3. When the boundary B0 is extracted such that it is different for a plurality of output colors, the difference in the appearance between the overlapping region A3 and the non-overlapping regions A1 and A2 is less recognized, and the image quality of the output image IM0 in the overlapping region A3 is improved.

Note that the numerical values initially assigned to the pixels of the selection priority information 500 are not necessarily be the same, and may be partially different.

In addition, the information for determining the second boundary B2 of the second output color may be boundary pixel determination number information storing the number of times the boundary pixel has been determined as the boundary pixel PX0 for each color for each pixel, and the like. For example, the nozzle assignment section 15 may extract, as the second boundary B2, a candidate with the smallest number of times of the boundary pixel determination from among the plurality of candidates Bp of the second boundary B2 on the basis of the boundary pixel determination number information.

After the boundary extraction process, the controller 10 performs, at the nozzle assignment section 15, a nozzle assignment process of generating the nozzle data DA4 on the basis of the halftone data DA3 and the boundary B0 for each color (at S140 in FIG. 5). The nozzle assignment section 15 generates the nozzle data DA4 by sorting the halftone data DA3 in the order of the dot formation at the driving section 50.

Figure 8:
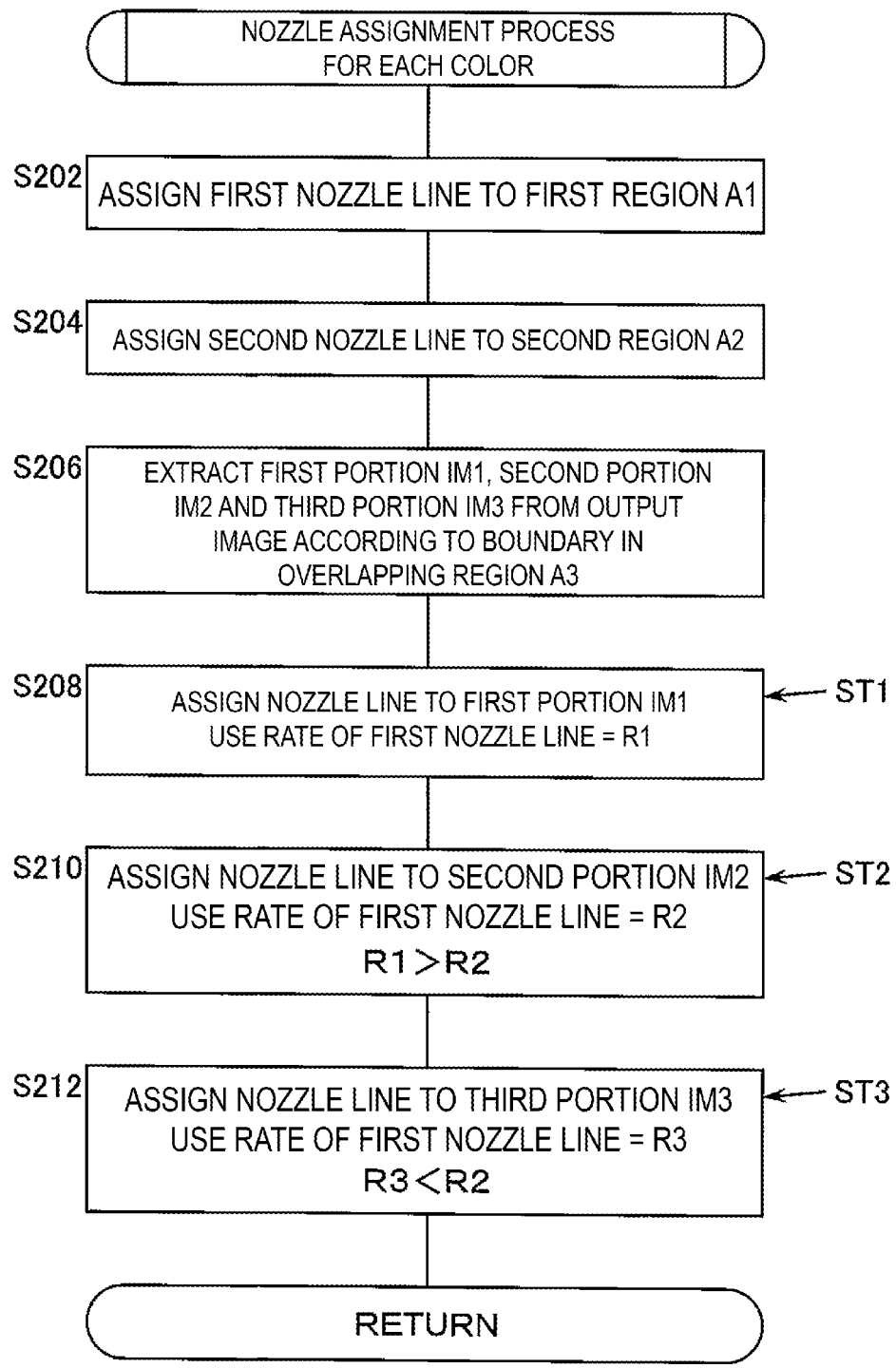
FIG. 8 is a drawing schematically illustrating an example of a nozzle assignment process.

FIG. 8 schematically exemplifies the nozzle assignment process for each color performed at S140 in FIG. 5. In FIG. 8, S208 corresponds to the first portion control section U1, the first portion control step ST1, and the first portion control function. S210 corresponds to the second portion control section U2, the second portion control step ST2, and the second portion control function. S212 corresponds to the third portion control section U3, the third portion control step ST3, and the third portion control function.

When the nozzle assignment process is started, the nozzle assignment section 15 assigns the first nozzle row 41 to the first region A1 corresponding to the second nozzle row non-present portion 44 of the recording head 30 (S202). The plurality of nozzles assigned to the first region A1 is nozzles included in the first nozzle row 41.

In addition, the nozzle assignment section 15 assigns the second nozzle row 42 to the second region A2 corresponding to the first nozzle row non-present portion 45 of the recording head 30 (S204). The plurality of nozzles assigned to the second region A2 is nozzles included in the second nozzle row 42.

Further, the nozzle assignment section 15 extracts the first portion IM1, the second portion IM2, and the third portion IM3 from the output image IM0 in accordance with the boundary B0 in the overlapping region A3 (S206). As described above, the first portion IM1 is a portion that is continuous from the first region A1 and is not continuous to the second region A2 in the output image IM0 in the overlapping region A3. The second portion IM2 is a portion continuous from the first region A1 and the second region A2 in the output image IM0 in the overlapping region A3. The third portion IM3 is a portion that is continuous from the second region A2 and is not continuous to the first region A1 in the output image IM0 in the overlapping region A3. Note that the independent portion that is not continuous from the first region A1 or the second region A2 is preferably handled as the second portion IM2, but may be handled as the first portion IM1, or as the third portion IM3.

Thereafter, for the first portion IM1, the nozzle assignment section 15 assigns the nozzle rows 41 and 42 in such a manner that the use rate of the first nozzle row 41 of the overlapping portion 43 is set to the first nozzle use rate R1 (S208). The assignment of the nozzle rows 41 and 42 can be performed by applying data mask to the halftone data DA3 in the first portion IM1, for example. In this case, it suffices to perform a process of assigning, in the first portion IM1, the nozzle data obtained by applying the data mask for setting the first nozzle use rate R1 to the halftone data DA3 to each nozzle of the first nozzle row 41 in the overlapping portion 43, and assigning the nozzle data obtained from the mask portion of the halftone data DA3 to each nozzle of the second nozzle row 42 in the overlapping portion 43.

In addition, for the second portion IM2, the nozzle assignment section 15 assigns the nozzle rows 41 and 42 in such a manner that the use rate of the first nozzle row 41 of the overlapping portion 43 is set to the second nozzle use rate R2 (S210). Here, the first nozzle use rate R1 for the first portion IM1 is higher than the second nozzle use rate R2 for the second portion IM2. At S210, it suffices to perform a process of assigning, in the second portion IM2, the nozzle data obtained by applying the data mask for setting the second nozzle use rate R2 to the halftone data DA3 to each nozzle of the first nozzle row 41 in the overlapping portion 43, and assigning the nozzle data obtained from the mask portion of the halftone data DA3 to each nozzle of the second nozzle row 42 in the overlapping portion 43.

Further, for the third portion IM3, the nozzle assignment section 15 assigns the nozzle rows 41 and 42 in such a manner that the use rate of the first nozzle row 41 of the overlapping portion 43 is set to the third nozzle use rate R3 (S212). The third nozzle use rate R3 for the third portion IM3 is lower than the second nozzle use rate R2 for the second portion IM2. At S212, it suffices to perform a process of assigning, in the third portion IM3, the nozzle data obtained by applying the data mask for setting the third nozzle use rate R3 to the halftone data DA3 to each nozzle of the first nozzle row 41 in the overlapping portion 43, and assigning the nozzle data obtained from the mask portion of the halftone data DA3 to each nozzle of the second nozzle row 42 in the overlapping portion 43.

In the above-mentioned manner, the nozzle data DA4 is generated from the halftone data DA3 for each color, and the nozzle assignment process is completed. Thereafter, the controller 10 transmits, at the drive signal transmission section 16, a control signal to the recording head 30 and the driving section 50 on the basis of the nozzle data DA4 (at S150 in FIG. 5), and terminates the recording control process illustrated in FIG. 5. From the nozzle data DA4, the driving signal transmission section 16 generates the driving signal SG corresponding to the voltage signal to be applied to the driving element 32, and outputs it to the driving circuit 31. The recording device 2 causes the driving section 50 to relatively move the recording head 30 and the medium ME1 in the relative movement direction D4, and causes the recording head 30 to discharge the droplet 37 to the medium ME1 in accordance with the drive signal SG. Thus, the output image IM0 including the dots DT0 of a plurality of output colors is formed on the medium ME1.

As illustrated in FIG. 4, since the first portion IM1 in the overlapping region A3 has a higher use rate of the first nozzle row 41 than the second portion IM2, the arrangement of dots is close to the image portion IM11 continuous from the first region A1. As a result, the difference in the appearance between the first portion IM1 and the image portion IM11 is less recognized. In addition, since the third portion IM3 in the overlapping region A3 has a lower use rate of the first nozzle row 41 than the second portion IM2, the arrangement of dots is close to the image portion IM32 continuous from the second region A2. As a result, the difference in the appearance between the third portion IM3 and the image portion IM32 is less recognized.

Therefore, a streak extending along the relative movement direction D4 is less formed in the overlapping region A3. Thus, the present specific example can improve the image quality of the output image IM0 in the overlapping region A3.

As exemplified in FIG. 9, the recording control device 1 of the present specific example can perform the nozzle assignment process at R1=100% or R3=0%. FIG. 9 schematically exemplifies a nozzle assignment process for each color at R1=100% and R3=0%. The processes of S202 to S206 illustrated in FIG. 9 are the same as the processes S202 to S206 illustrated in FIG. 8.

After the processes of S202 to S206, for the first portion IM1, the nozzle assignment section 15 assigns the first nozzle row 42 without assigning the second nozzle row 42 in such a manner that the use rate of the first nozzle row 41 of the overlapping portion 43 is set to 100% (S208). In this case, it suffices to perform a process of assigning the halftone data DA3 as it is as nozzle data to each nozzle of the first nozzle row 41 in the first portion IM1.

In addition, for the second portion IM2, the nozzle assignment section 15 assigns the nozzle rows 41 and 42 in such a manner that the use rate of the first nozzle row 41 of the overlapping portion 43 is set to the second nozzle use rate R2 (S210). Here, 0%<R2<100% holds. The assignment of the nozzle rows 41 and 42 can be performed by applying to data mask to the halftone data DA3 in the second portion IM2, for example.

Further, for the third portion IM3, the nozzle assignment section 15 assigns the second nozzle row 42 without assigning the first nozzle row 41 in such a manner that the use rate of the first nozzle row 41 of the overlapping portion 43 is set to 0% (S212). In this case, it suffices to perform a process of assigning the halftone data DA3 as it is as nozzle data to each nozzle of the second nozzle row 42 in the third portion IM3.

In the above-mentioned manner, the nozzle data DA4 is generated from the halftone data DA3 for each color, and the nozzle assignment process is completed.

As illustrated in FIG. 4, the first portion IM1 in the overlapping region A3 is formed by the first dot DT1 of the first nozzle row 41, and therefore the arrangement of dots is the same as the image portion IM11 continuous from in the first region A1. As a result, the appearance is uniform from the image portion IM11 of the first region A1 to the first portion IM1 of the overlapping region A3. In addition, the third portion IM3 in the overlapping region A3 is formed by the second dot DT2 of the second nozzle row 42, and therefore the arrangement of dots is the same as the image portion IM32 continuous from the second region A2. As a result, the appearance is uniform from the image portion IM32 of the second region A2 to the third portion IM3 of the overlapping region A3. Thus, the image quality of the output image IM0 in the overlapping region A3 is further improved.

Figure 10:
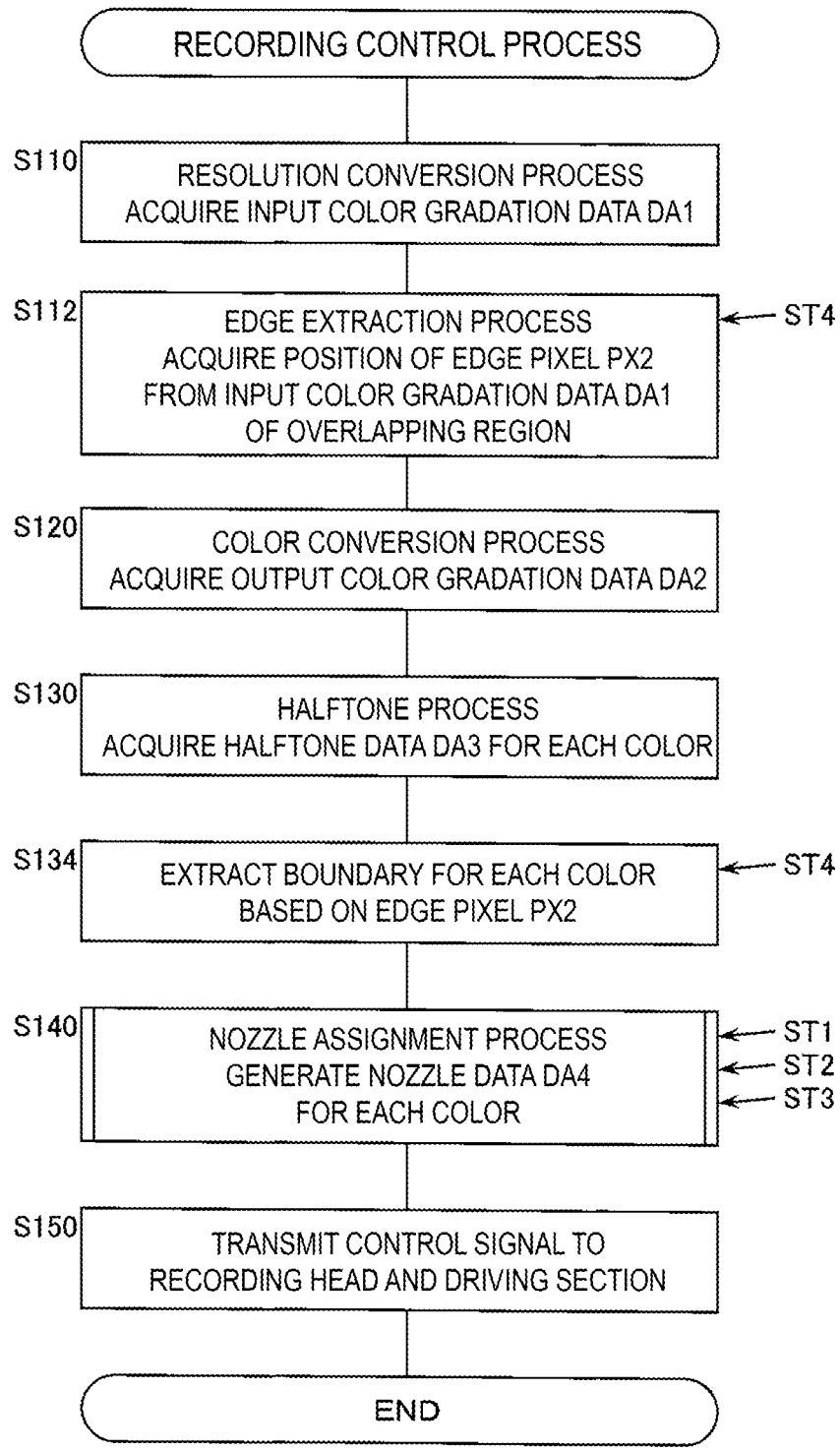
FIG. 10 is a flowchart of an example of a recording control process.

As exemplified in FIG. 10, the recording control device 1 of the present specific example can also extract the edge pixel PX2 present in the output image IM0 in the overlapping region A3 on the basis of the input color gradation data DA1. FIG. 10 exemplifies a recording control process of extracting a connection of the edge pixel PX2 as the boundary B0. In comparison with the recording control process illustrated in FIG. 5, in the recording control process illustrated in FIG. 10, S112 is added between S110 and S120, and S132 is replaced by S134. S112 and S134 correspond to the boundary extraction section U4 illustrated in FIG. 1, the boundary extraction step ST4, and boundary extraction function.

After the resolution conversion process at S110, the controller 10 performs, at the resolution conversion section 12 as the boundary extraction section U4, an edge extraction process of extracting the edge pixel PX2 present in the output image IM0 in the overlapping region A3 on the basis of the input color gradation data DA1 that is RGB data (S112).

Figure 11:
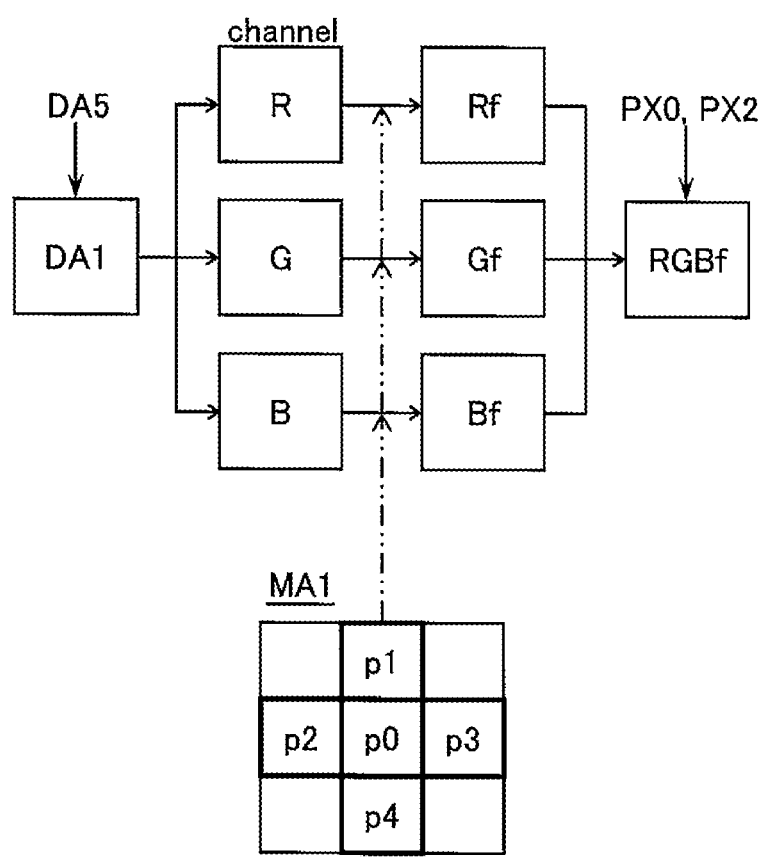
FIG. 11 is a drawing schematically illustrating an example in which an edge portion is extracted from input color gradation data.

FIG. 11 schematically exemplifies a state where an edge pixel PX2 as the edge portion is extracted from the input color gradation data DA1. The input color gradation data DA1 is an example of the gradation data DA5 with a larger number of gradations than the halftone data DA3 representing a formation state of dots.

First, the boundary extraction section U4 decomposes the input color gradation data DA1 that is RGB data into R, G and B channels and extracts edge pixels Rf, Gf and Bf for respective channels. The lower part in FIG. 8 illustrates a matrix MA1, which indicates the pixels to be calculated in the edge extraction process for each channel. The boundary extraction section U4 performs the edge extraction process using a focus pixel p0 for determining whether it is an edge pixel, and surrounding pixels p1, p2, p3 and p4 located at four positions vertically or horizontally adjacent to the focus pixel p0. Whether the focus pixel p0 is edge pixels Rf, Gf and Bf can be determined based on the difference between the input value of the focus pixel p0 and the input values of the surrounding pixels p1 to p4. The input value of each of the pixels p0 to p4 can be calculated by the following colors.

Input value=α1×R×α2×G+α3×B

Here, coefficients a1, a2 and a3 are "1" for only the coefficient corresponding to a channel for performing the determination whether it is an edge pixel, and "0" for the rest. The R, G, and B in the equation are the gradation values of the R, G, and B components.

The boundary extraction section U4 determines whether larger one of the absolute value of the difference between the input value of the focus pixel p0 and a maximum value Pmax of the input values of the surrounding pixels p1 to p4, and the absolute value of the difference between the input value of the focus pixel p0 and a minimum value Pmin of the input values of the surrounding pixels p1 to p4 is greater than a predetermined threshold value TH1. When the following inequality holds, it is determined that the focus pixel p0 is the edge pixels Rf, Gf and Bf.

Max(|P max|,|P min|)>TH1

Here, the function Max is a function for selecting a maximum value from among a plurality of components. When the above-mentioned inequality does not hold, it is determined that the focus pixel p0 is not the edge pixels Rf, Gf and Bf.

The boundary extraction section U4 merges the edge pixels Rf, Gf and Bf of the channels, and extracts a result as an edge pixel RGBf. For example, the boundary extraction section U4 extracts, as the edge pixel RGBf, a pixel in which the edge pixels Rf, Gf and Bf are present in at least one channel. The edge pixel RGBf is an example of the edge pixel PX2, and is an example of the boundary pixel PX0.

After the edge extraction process, the controller 10 performs the color conversion process (at S120 in FIG. 10), and performs the halftone process (S130). After the halftone process, the controller 10 extracts, at the nozzle assignment section 15, the non-continuous boundary B0 present in the output image IM0 in the overlapping region A3 for each color on the basis of the extracted edge pixel PX2 (S134). For example, the nozzle assignment section 15 extracts the boundary B0 such that it is different as much as possible for the plurality of output colors on the basis of the selection priority information 500 illustrated in FIGS. 6 and 7.

After the extraction of the boundary B0, the controller 10 performs the nozzle assignment process (S140). In the nozzle assignment process, the nozzle assignment section 15 may perform the nozzle assignment process for each color illustrated in FIGS. 8 and 9. After the nozzle assignment process, the controller 10 transmits a control signal to the recording head 30 and the driving section 50 on the basis of the nozzle data DA4 (S150), and terminates the recording control process illustrated in FIG. 10.

As illustrated in FIG. 4, since the first portion IM1 in the overlapping region A3 has a higher use rate of the first nozzle row 41 than the second portion IM2, the arrangement of dots is close to the image portion IM11 continuous from the first region A1. As a result, the difference in the appearance between the first portion IM1 and the image portion IM11 is less recognized. In addition, since the third portion IM3 in the overlapping region A3 has a lower use rate of the first nozzle row 41 than the second portion IM2, the arrangement of dots is close to the image portion IM32 continuous from the second region A2. As a result, the difference in the appearance between the third portion IM3 and the image portion IM32 is less recognized. Thus, a streak extending along the relative movement direction D4 is less formed in the overlapping region A3, and the image quality of the output image IM0 in the overlapping region A3 is improved.

Note that in the recording control process illustrated in FIG. 5, it is possible to add the edge extraction process of S112 illustrated in FIG. 10, and extract the non-continuous boundary B0 present in the output image IM0 in the overlapping region A3 for each color on the basis of both the edge pixel PX2 and the blank pixel PX1 at S132.

The recording control device 1 of the present specific example may extract the edge pixel PX2 present in the output image IM0 in the overlapping region A3 on the basis of the output color gradation data DA2. In this case, in the recording control process illustrated in FIG. 10, S112 may be deleted, and the edge extraction process may be added between S120 and S130. In this case, after the color conversion process of S120, the controller 10 performs, at the color conversion section 13 as the boundary extraction section U4, an edge extraction process of extracting the edge pixel PX2 present in the output image IM0 in the overlapping region A3 on the basis of the output color gradation data DA2 that is CMYK data.

Figure 12:
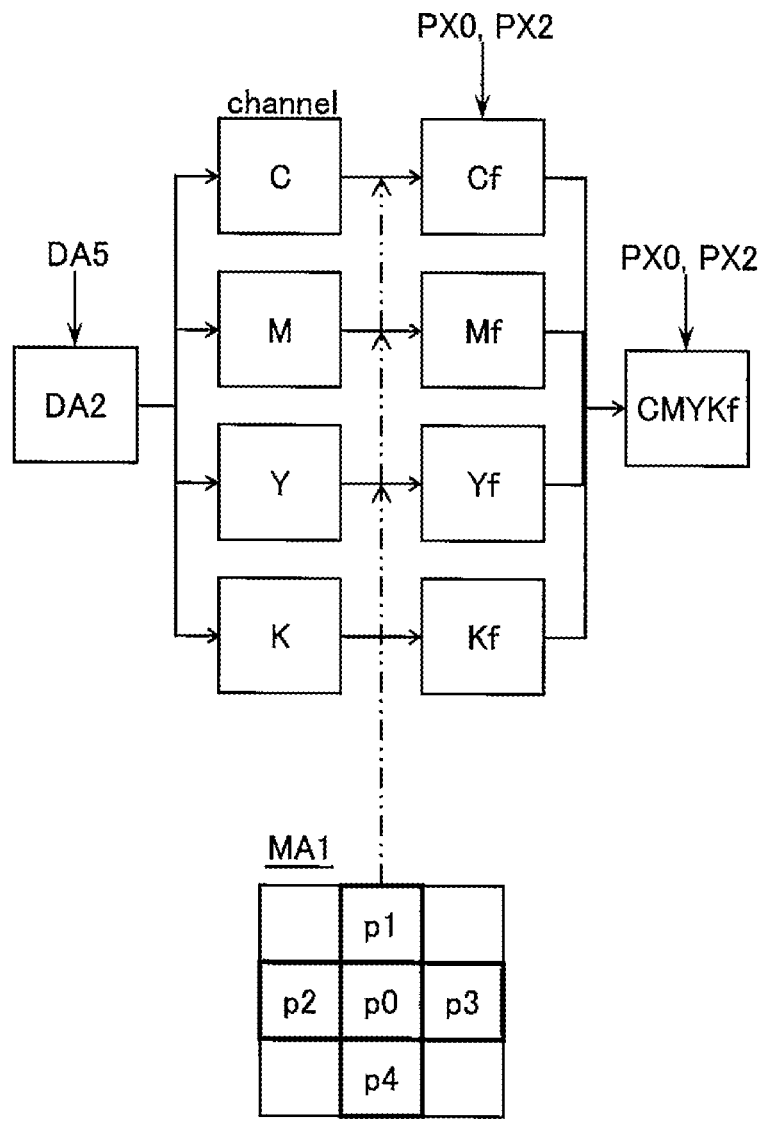
FIG. 12 is a drawing schematically illustrating an example in which an edge portion is extracted from output color gradation data.

FIG. 12 schematically exemplifies a state where the edge pixel PX2 as an edge portion is extracted from the output color gradation data DA2. The output color gradation data DA2 is an example of the gradation data DA5 with a larger number of gradations than the halftone data DA3 representing the formation state of dots.

First, the boundary extraction section U4 decomposes the output color gradation data DA2 that is CMYK data into C, M, Y and K channels, and extracts edge pixels Cf, Mf, Yf and Kf for respective channels. The lower part of FIG. 12 illustrates a matrix MA1, which indicates the pixels to be calculated in the edge extraction process for each channel. The boundary extraction section U4 performs the edge extraction process using a focus pixel p0 for determining whether it is an edge pixel, and surrounding pixels p1, p2, p3 and p4 located at four positions vertically or horizontally adjacent to the focus pixel p0. The input value of each of the pixels p0 to p4 can be calculated by the following colors.

Input Value=α1×C+α2×M+α3×Y+α4×K

Here, coefficients α1, α2, α3 and α4 are "1" for only the coefficient corresponding to a channel for performing the determination whether it is an edge pixel, and "0" for the rest. C, M, Y and K in the equation are the gradation values of the C, M, Y and K components.

The boundary extraction section U4 determines whether larger one of the absolute value of the difference between the input value of the focus pixel p0 and a maximum value Pmax of the input values of the surrounding pixels p1 to p4, and the absolute value of the difference between the input value of the focus pixel p0 and a minimum value Pmin of the input values of the surrounding pixels p1 to p4 is greater than a predetermined threshold value TH1. When the following inequality holds, the focus pixel p0 is determined to be the edge pixels Cf, Mf, Yf and Kf. When the following inequality does not hold, the focus pixel p0 edge pixels is determined not to be Cf, Mf, Yf and Kf.

Max(|Pmax|,|Pmin|)>TH1

The edge pixels Cf, Mf, Yf and Kf correspond to the output colors of C, M, Y and K, respectively, and therefore the boundary extraction process at S134 in FIG. 10 may be performed as the edge pixel PX2. The edge pixels Cf, Mf, Yf and Kf are examples of the edge pixel PX2, and examples of the boundary pixel PX0.

In addition, the boundary extraction section U4 may merge the edge pixels Cf, Mf, Yf and Kf of the channels, and may extract the obtained result as the edge pixel CMYKf. For example, the boundary extraction section U4 may extract the pixel in which the edge pixels Cf, Mf, Yf and Kf are present in at least one channel as the edge pixel CMYKf. The edge pixel CMYKf is an example of the edge pixel PX2, and is an example of the boundary pixel PX0.

After the edge extraction process, the controller 10 performs the halftone process (at S130 in FIG. 10). After the halftone process, the controller 10 extracts, at the nozzle assignment section 15, the non-continuous boundary B0 present in the output image IM0 in the overlapping region A3 for each color on the basis of the extracted edge pixel PX2 (S134). After the extraction of the boundary B0, the controller 10 performs the nozzle assignment process (S140), transmits a control signal to the recording head 30 and the driving section 50 on the basis of the nozzle data DA4 (S150), and terminates the recording control process illustrated in FIG. 10.

Even when the edge pixel PX2 is extracted based on the output color gradation data DA2, a streak extending along the relative movement direction D4 is less formed in the overlapping region A3, and the image quality of the output image IM0 in the overlapping region A3 is improved. Also in this case, in the recording control process illustrated in FIG. 5, it is possible to add the edge extraction process, and extract the non-continuous boundary B0 present in the output image IM0 in the overlapping region A3 for each color on the basis of both the edge pixel PX2 and the blank pixel PX1 at S132.

(4) Exemplary Application to Case where Arrangement of Nozzle Line Partially Overlaps between Main Scans in Sending Direction Incidentally, in the case where the recording device 2 illustrated in FIG. 1 is a serial-type recording device, the arrangement of the nozzle row 33 may partially overlap between the main scans in the feed direction D2. The present technology is also applicable to such a case.

FIG. 13 schematically exemplifies a correspondence relationship between the nozzle row 33 of the recording head 30 and the recording region A0 in two main scans. The serial-type recording device performs recording on the medium ME1 by the recording head 30 including the nozzle row 33, a main scan of moving the recording head 30 in the main scan direction D1 by the carriage driving section 51, and a sub scan of moving the medium ME1 in the feed direction D2 by roller driving section 55. In the main scan, the recording head 30 and the medium ME1 relatively move in the main scan direction D1 that intersects the nozzle alignment direction D3 of the nozzle row 33. In the sub scan, the recording head 30 and the medium ME1 relatively move in the feed direction D2 that intersects the main scan direction D1. The controller 10 controls recording on the medium ME1 by the recording head 30, the main scan, and the sub scan.

When performing two-direction recording, the controller 10 forms the dot DT0 on the medium ME1 while the recording head 30 is moving in the forward direction D11, and forms the dot DT0 on the medium ME1 while the recording head 30 is moving in the backward direction D12 opposite the forward direction D11. When performing single-direction recording, the controller 10 forms the dot DT0 on the medium ME1 while the recording head 30 is moving in the forward direction D11, and performs a control such that the dot DT0 is not formed while the recording head 30 is moving in the backward direction D12.

Here, two main scans in which the arrangement of the nozzle row 33 in the feed direction D2 partially overlaps are the first main scan 61 and the second main scan 62. Specifically, in the second main scan 62, which is performed after the first main scan 61, the arrangement of the nozzle row 33 in the feed direction D2 partially overlaps the first main scan 61. In the above-described two main scans, the portion where the nozzle row 33 is present during the first main scan and the second main scan is referred to as the overlapping portion 63, a second main scan nozzle row non-present portion where the nozzle row 33 is present during the first main scan and the nozzle row 33 is not present during the second main scan is referred to as the portion 64, and a first main scan nozzle row non-present portion where the nozzle row 33 is present during the second main scan and the nozzle row 33 is not present during the first main scan is referred to as the portion 65.

Note that since which of the plurality of main scans corresponds to main scans 61 and 62 is determined relative to each other, the later main scan may correspond to the first main scan 61, and the former main scan may correspond to the second main scan 62.

When the recording head 30 discharges the droplet 37 to the medium ME1 while the recording head 30 and the medium ME1 relatively move in the main scan direction D1, the dot DT0 composed of the droplet 37 is formed on the medium ME1. The dot DT0 is a collective term of the first dot DT1 formed by the droplet 37 discharged from the nozzle row 33 during the first main scan, and the second dot DT2 formed by the droplet 37 discharged from the nozzle row 33 during the second main scan. Here, the region where recording on the medium ME1 is performed when the first main scan 61 and the second main scan 62 are performed is the recording region A0. The recording region A0 includes the first region A1 corresponding to the second main scan nozzle row non-present portion 64, the overlapping region A3 corresponding to the overlapping portion 63, and the second region A2 corresponding to the first main scan nozzle row non-present portion 65.

Figure 14:
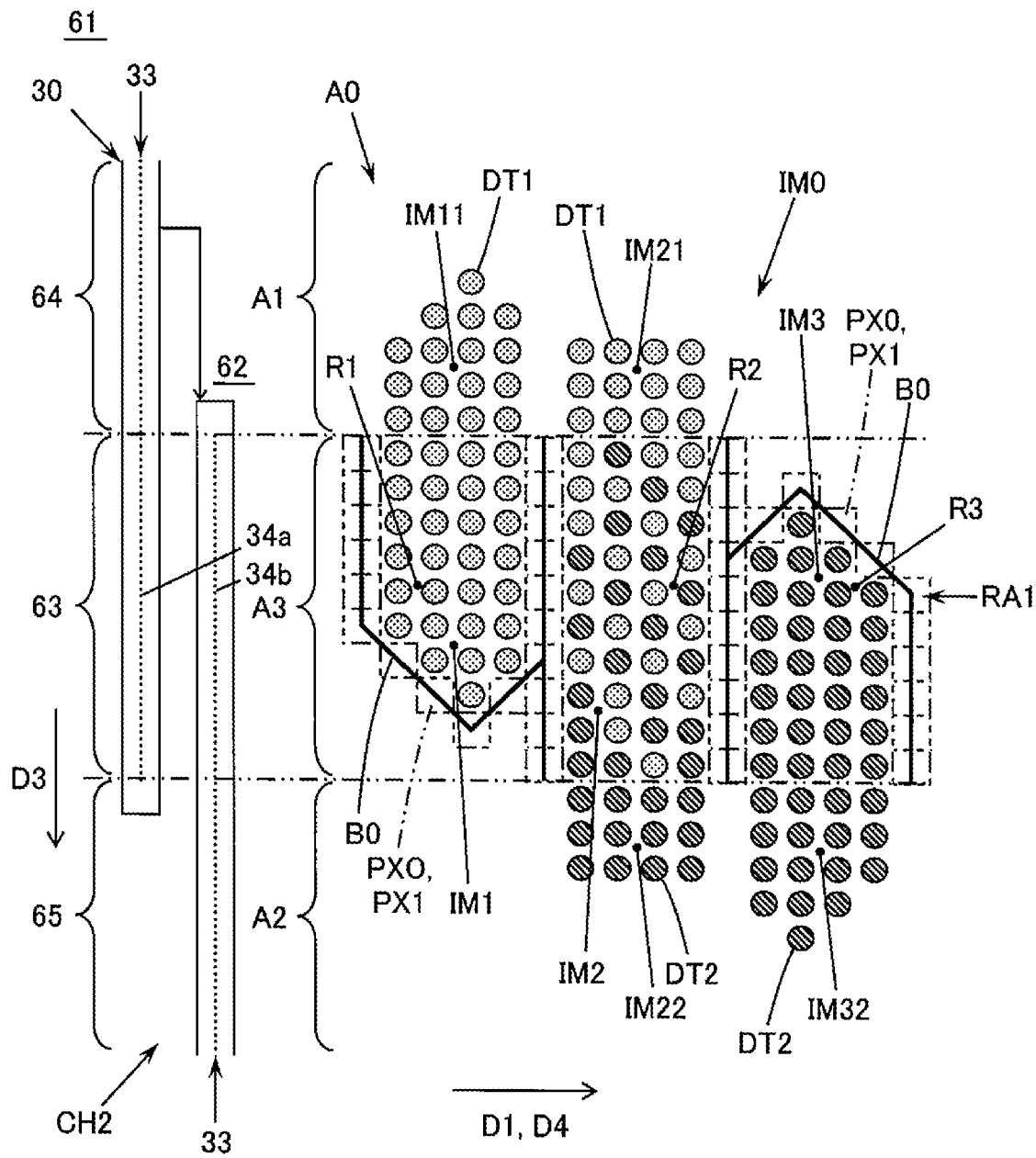
FIG. 14 is a drawing schematically illustrating an example of an output image formed in a recording region through two main scans.

FIG. 14 schematically exemplifies the output image IM0 formed through two main scans in the recording region A0 together with the recording head 30. In FIG. 14, for the sake of clarity of illustration, only any one of C, M, Y and K is illustrated as the nozzle row 33 of the recording head 30. In addition, while the number of pixels in the nozzle alignment direction D3 is ten in the overlapping region A3 in FIG. 14, the number of pixels may be 11 or greater, or nine or smaller.

The output image IM0 formed on the medium ME1 in the overlapping region A3 may include the first portion IM1, which is continuous from the first region A1 and is not continuous to the second region A2, the second portion IM2, which is continuous from the first region A1 and the second region A2, and the third portion IM3, which is continuous from the second region A2 and is not continuous to the first region A1. As the boundary extraction section U4 illustrated in FIG. 1, the controller 10 extracts the non-continuous boundary B0 present in the output image IM0 in the overlapping region A3 on the basis of image data corresponding to the output image IM0. The boundary B0 defines the first portion IM1, the second portion IM2, and the third portion IM3 from the output image IM0 in the overlapping region A3. As the first portion control section U1 illustrated in FIG. 1, the controller 10 performs a control of forming the first portion IM1 in such a manner that the use rate of the nozzle row 33 during the first main scan in the overlapping portion 63 is set to the first nozzle use rate R1. In addition, as the second portion control section U2 illustrated in FIG. 1, the controller 10 performs a control of forming the second portion IM2 in such a manner that the use rate of the nozzle row 33 during the first main scan in the overlapping portion 63 is set to the second nozzle use rate R2. Further, as the third portion control section U3 illustrated in FIG. 1, the controller 10 performs a control of forming the third portion IM3 in such a manner that the use rate of the nozzle row 33 during the first main scan in the overlapping portion 63 is set to the third nozzle use rate R3. In the present specific example, the use rate of the nozzle row 33 during the first main scan in the overlapping portion 63 is set to R1>R2>R3.

A serial-type recording device can also form the output image IM0 on the medium ME1 in accordance with the recording control process illustrated in FIGS. 5 and 10. For example, when the recording control process illustrated in FIG. 5 is performed, the controller 10 performs the resolution conversion process (S110), the color conversion process (S120), the halftone process (S130), and the process of extracting the boundary B0 as illustrated in FIGS. 6 and 7 (S132). Thereafter, the controller 10 performs the nozzle assignment process for each color as illustrated in FIGS. 15 and 16 (S140), transmits a control signal to the recording head 30 and the driving section 50 on the basis of the nozzle data DA4 (S150), and terminates the recording control process.

Figure 15:
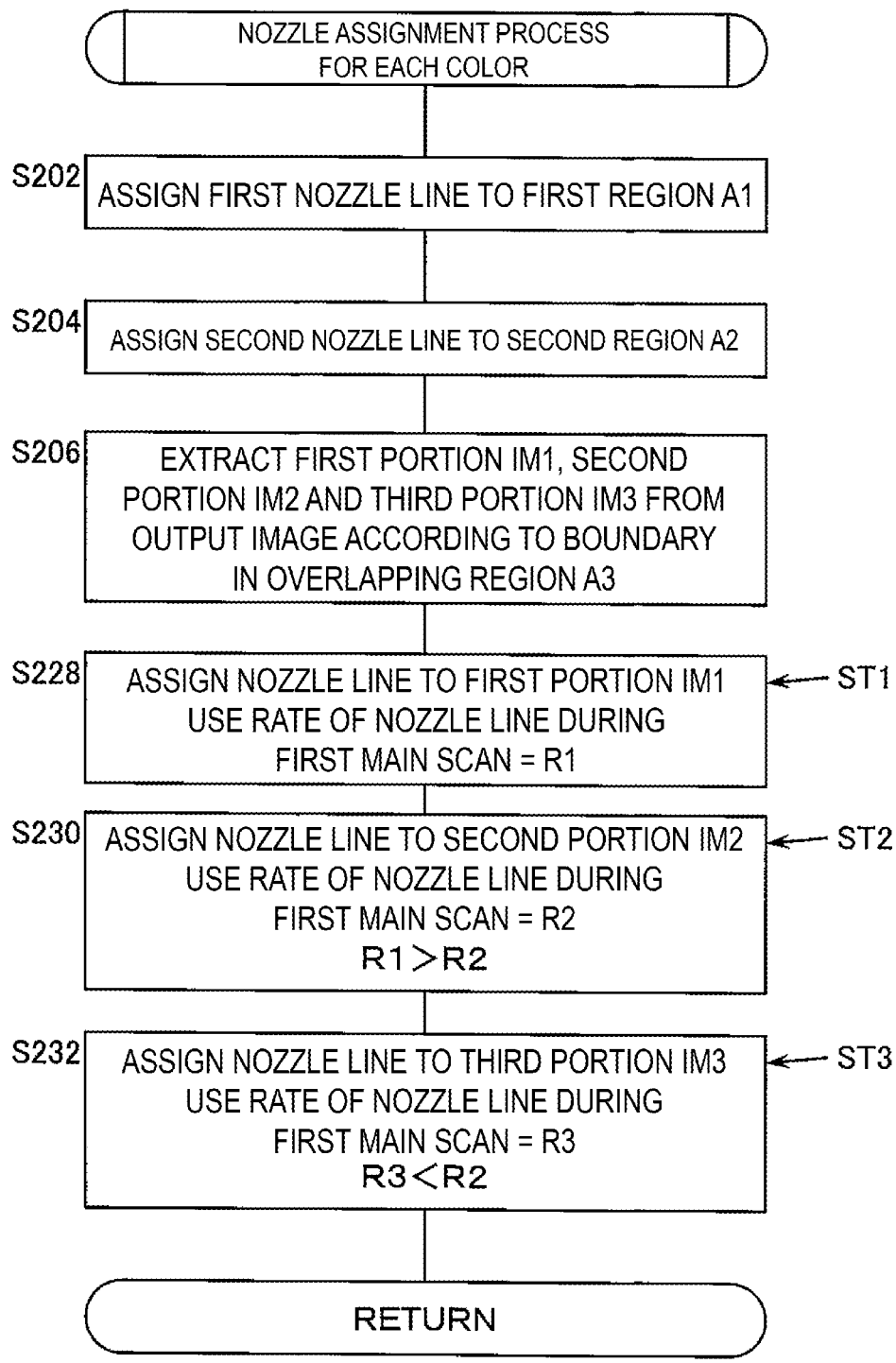
FIG. 15 is a drawing schematically illustrating an example of a nozzle assignment process.
Figure 16:
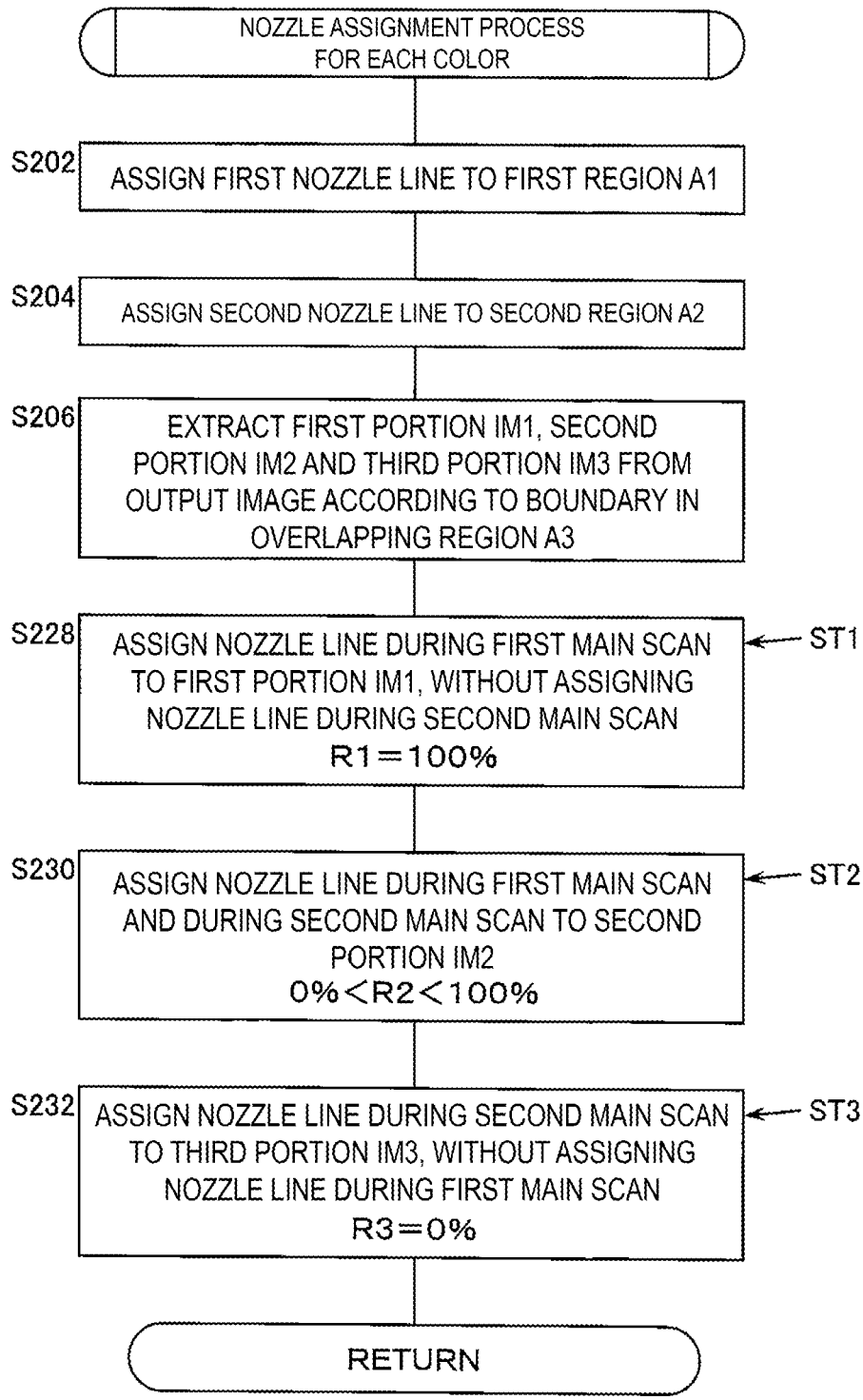
FIG. 16 is a drawing schematically illustrating an example of a nozzle assignment process at R1=100% and R3=0%.

FIG. 15 schematically exemplifies a nozzle assignment process for each color that is performed at S140 FIGS. 5 and 10. In comparison with the nozzle assignment process illustrated in FIG. 8, in the nozzle assignment process illustrated in FIGS. 15, S208 to S212 are replaced by S228 to S232. S228 corresponds to the first portion control section U1, the first portion control step ST1, and the first portion control function. S230 corresponds to the second portion control section U2, the second portion control step ST2, and the second portion control function. S232 corresponds to the third portion control section U3, the third portion control step ST3, and the third portion control function.

After the process of S206, for the first portion IM1, the nozzle assignment section 15 assigns the nozzle row 33 in such a manner that the use rate of the nozzle row 33 during the first main scan in the overlapping portion 63 is set to the first nozzle use rate R1 (S228). The assignment of the nozzle row 33 during the first main scan and the second main scan can be performed by applying data mask to the halftone data DA3 in the first portion IM1, for example.

In addition, for the second portion IM2, the nozzle assignment section 15 assigns the nozzle row 33 in such a manner that the use rate of the nozzle row 33 during the first main scan in the overlapping portion 63 is set to the second nozzle use rate R2 (S230). Here, the first nozzle use rate R1 for the first portion IM1 is higher than the second nozzle use rate R2 for the second portion IM2.

Further, for the third portion IM3, the nozzle assignment section 15 assigns the nozzle row 33 in such a manner that the use rate of the nozzle row 33 during the first main scan in the overlapping portion 63 is set to the third nozzle use rate R3 (S232). The third nozzle use rate R3 for the third portion IM3 is lower than the second nozzle use rate R2 for the second portion IM2.

In the above-mentioned manner, the nozzle data DA4 is generated from the halftone data DA3 for each color, and the nozzle assignment process is completed. Thereafter, the controller 10 transmits a control signal to the recording head 30 and the driving section 50 on the basis of the nozzle data DA4 (at S150 in FIG. 5), and terminates the recording control process illustrated in FIG. 5.

As illustrated in FIG. 14, since the first portion IM1 in the overlapping region A3 is higher in the use rate of the nozzle row 33 during the first main scan than the second portion IM2, the arrangement of dots is close to the image portion IM11 continuous from the first region A1. As a result, the difference in the appearance between the first portion IM1 and the image portion IM11 is less recognized. In addition, since the third portion IM3 in the overlapping region A3 is lower in the use rate of the nozzle row 33 during the first main scan than the second portion IM2, the arrangement of dots is close to the image portion IM32 continuous from the second region A2. As a result, the difference in the appearance between the third portion IM3 and the image portion IM32 is less recognized. Thus, a streak extending along the relative movement direction D4 is less formed in the overlapping region A3, and the image quality of the output image IM0 in the overlapping region A3 is improved.

As exemplified in FIG. 16, the recording control device 1 of the present specific example can perform the nozzle assignment process at R1=100% or R3=0%. FIG. 16 schematically exemplifies a nozzle assignment process for each color at R1=100% and R3=0%. The processes of S202 to S206 illustrated in FIG. 16 are the same as the processes of S202 to S206 illustrated in FIGS. 8, 9, and 15.

After the processes of S202 to S206, for the first portion IM1, the nozzle assignment section 15 assigns the nozzle row 33 during the first main scan without assigning the nozzle row 33 during the second main scan (S228) in such a manner that the use rate of the nozzle row 33 during the first main scan in the overlapping portion 63 is set to 100%. In this case, it suffices to perform a process of assigning the halftone data DA3 as it is as nozzle data to each nozzle of the nozzle row 33 during the first main scan in the first portion IM1.

In addition, for the second portion IM2, the nozzle assignment section 15 assigns the nozzle row 33 in such a manner that the use rate of the nozzle row 33 during the first main scan in the overlapping portion 63 is set to the second nozzle use rate R2 (S230). Here, 0%<R2<100% holds. The assignment of the nozzle row 33 can be performed by applying data mask to the halftone data DA3 in the second portion IM2.

Further, for the third portion IM3, the nozzle assignment section 15 assigns the nozzle row 33 during the second main scan without assigning the nozzle row 33 during the first main scan (S232) in such a manner that the use rate of the nozzle row 33 during the first main scan in the overlapping portion 63 is set to 0%. In this case, it suffices to perform a process of assigning the halftone data DA3 as it is as nozzle data to each nozzle of the nozzle row 33 during the second main scan in the third portion IM3.

In the above-mentioned manner, the nozzle data DA4 is generated from the halftone data DA3 for each color, and the nozzle assignment process is completed.

As illustrated in FIG. 14, the first portion IM1 in the overlapping region A3 is formed by the first dot DT1 of the nozzle row 33 during the first main scan, and therefore the arrangement of dots is the same as the image portion IM11 continuous from the first region A1. As a result, the appearance is uniform from the image portion IM11 of the first region A1 to the first portion IM1 of the overlapping region A3. In addition, the third portion IM3 in the overlapping region A3 is formed by the second dot DT2 of the nozzle row 33 during the second main scan, and therefore the arrangement of dots is the same as the image portion IM32 continuous from the second region A2. As a result, the appearance is uniform from the image portion IM32 of the second region A2 to the third portion IM3 of the overlapping region A3. Thus, the image quality of the output image IM0 in the overlapping region A3 is further improved.

(5) Modification

Various modifications may be made in the present disclosure.

For example, at least a part of the above-described process may be performed by the host device HO1. In the case where the host device HO1 can execute the resolution conversion process, the host device HO1 may transmit the input color gradation data DA1 to the recording device 2, and the controller 10 of the recording device 2 receiving the input color gradation data DA1 may acquire the input color gradation data DA1 at S110 in FIGS. 5 and 10. In the case where the host device HO1 can also execute the color conversion process, the host device HO1 may transmit the output color gradation data DA2 to the recording device 2, and the controller 10 of the recording device 2 receiving the output color gradation data DA2 may acquire the output color gradation data DA2 at S120 in FIGS. 5 and 10. In the case where the host device HO1 can also execute the halftone process, the host device HO1 may transmit the halftone data DA3 to the recording device 2, and the controller 10 of the recording device 2 receiving the halftone data DA3 may acquire the halftone data DA3 at S130 in FIGS. 5 and 10. In each case, the combination of the host device HO1 and the recording device 2 includes the recording control device 1.

In addition, in the case where the host device HO1 can also execute the nozzle assignment process, the host device HO1 may transmit the nozzle data DA4 to the recording device 2, and the controller 10 of the recording device 2 receiving the nozzle data DA4 may transmit a control signal to the recording head 30 and the driving section 50 on the basis of the nozzle data DA4 at S150 in FIGS. 5 and 10. In this case, the host device HO1 includes the recording control device 1.

The type of the liquid used in the recording device is not limited to C, M, Y and K, and may include, in addition to C, M, Y and K, light cyan less dense than C, light magenta less dense than M, dark yellow more dense than Y, orange, green, light black less dense than K, clear for improving the image quality, and the like. In addition, the present technology is also applicable to recording devices that do not use some of the liquids of C, M, Y and K.

The above-described process may be appropriately changed by changing the order and the like. For example, in the nozzle assignment process of FIGS. 8 and 9, the processes of S206 to S212 may be performed before any of the process of S202 and S204.

The process of generating the nozzle data DA4 from the halftone data DA3 is not limited to the process of using data mask. For example, in the case where the recording head 30 includes the chips CH1 and CH2 as illustrated in FIG. 2, the halftone data DA3 may be separated into halftone data for the first nozzle row 41 and halftone data for the second nozzle row 42 to set the use rates R1, R2 and R3, and the nozzle data DA4 may be generated from each halftone data. In the case where a serial-type recording device is used as illustrated in FIG. 13, the halftone data DA3 may be separated into halftone data during the first main scan and halftone data during the second main scan to set the use rates R1, R2 and R3, and the nozzle data DA4 may be generated from each halftone data.

In the case where a serial-type recording device is used, the controller 10 may search for a boundary candidate pixel that can be the boundary pixel PX0 in the entirety of the output image IM0 on the basis of the image data before forming the output image IM0 on the medium ME1. In the case where the boundary candidate pixel is not present in the overlapping region A3 but is present in the vicinity of the overlapping region A3, the controller 10 may adjust the moving amount of the medium ME1 in the feed direction D2 such that the boundary candidate pixel is included in the overlapping region A3.

Note that even in the case where the recording control device 1 does not include the third portion control section U3, it is possible to achieve the effect of improving the image quality of the output image in the overlapping region corresponding to the overlapping portion of the nozzle row in the nozzle alignment direction.

(6) Conclusion

As described above, the present disclosure can provide a technique for improving the image quality of the output image in the overlapping region corresponding to the overlapping portion of the nozzle row in the nozzle alignment direction, and the like in various aspects. Naturally, the above-described basic actions and effects can be obtained even with technology composed only of the elements of the independent claims.

It is also possible to implement a configuration in which each configuration disclosed in the examples above is mutually substituted or combined with each other, or a configuration in which each configuration disclosed in the known technology and the examples above is mutually substituted or combined with each other, and the like. The present disclosure includes these configurations and the like.

What is claimed is:

1. A recording control device configured to control recording on a medium by a recording head including a plurality of nozzle rows, and a relative movement of the recording head and the medium in a relative movement direction that intersects a nozzle alignment direction of the plurality of nozzle rows, the recording control device comprising:
   a first portion control section and a second portion control section; and
   the recording head including the plurality of nozzle rows that have a first nozzle row, and a second nozzle row that partially overlaps the first nozzle row in the nozzle alignment direction, wherein
   when, in a recording region that is recorded on the medium during the relative movement,
      a region corresponding to a portion where the first nozzle row is present and the second nozzle row is not present is a first region,
      a region corresponding to an overlapping portion where the first nozzle row and the second nozzle row overlap each other is an overlapping region,
      a region corresponding to a portion where the second nozzle row is present and the first nozzle row is not present is a second region,
      a portion that corresponds to a part of the overlapping region and is continuous from the first region and is not continuous to the second region is a first portion, and a portion that corresponds to a part of the overlapping region and is continuous with the first region and the second region is a second portion, the first portion control section is configured to form the first portion as a part of an output image on the medium in such a manner that a use rate of the first nozzle row of the overlapping portion is set to a first nozzle use rate, and the second portion control section is configured to form the second portion as a part of the output image on the medium in such a manner that the use rate of the first nozzle row of the overlapping portion is set to a second nozzle use rate are provided; and the first nozzle use rate is higher than the second nozzle use rate.

2. The recording control device according to claim 1, wherein the first portion control section forms the first portion without using the second nozzle row.

3. The recording control device according to claim 1, wherein the recording control device further includes a third portion control section configured to form a third portion in such a manner that the use rate of the first nozzle row of the overlapping portion is set to a third nozzle use rate, the third portion being a portion that corresponds to a part of the overlapping region and is continuous from the second region and is not continuous to the first region; and the third nozzle use rate is lower than the second nozzle use rate.

4. The recording control device according to claim 3, wherein the third portion control section forms the third portion without using the first nozzle row.

5. The recording control device according to claim 1, further comprising a boundary extraction section configured to extract a non-continuous boundary present in the output image in the overlapping region on a basis of image data corresponding to the output image, wherein the first portion control section forms the first portion in accordance with the boundary in the overlapping region, the first portion being a portion that is continuous from the first region and is not continuous to the second region in the output image; and the second portion control section forms the second portion in accordance with the boundary in the overlapping region, the second portion being a portion that is continuous with the first region and the second region in the output image.

6. The recording control device according to claim 5, wherein the boundary extraction section extracts at least one of a blank portion and an edge portion as the boundary present in the output image in the overlapping region on a basis of the image data.

7. The recording control device according to claim 6, wherein the output image includes a dot of a plurality of output colors;

the image data includes halftone data that represents a formation state of the dot for each of the plurality of output colors; and for each of the plurality of output colors, the boundary extraction section extracts a pixel where the dot is not formed as the blank portion present in the output image in the overlapping region on a basis of the halftone data.

8. The recording control device according to claim 6, wherein the output image includes a dot of a plurality of output colors;

the image data includes gradation data with a larger number of gradations than halftone data that represents a formation state of the dot; and the boundary extraction section extracts an edge portion present in the output image in the overlapping region on a basis of the gradation data.

9. The recording control device according to claim 5, wherein the output image includes a dot of a plurality of output colors;

the plurality of output colors includes a first output color and a second output color;

for the first output color, the boundary extraction section extracts a first boundary on a basis of the image data, the first boundary being the boundary present in the output image in the overlapping region; and for the second output color, the boundary extraction section extracts a second boundary on the basis of the image data, the second boundary being a candidate different from the first boundary among a plurality of candidates of the boundary present in the output image in the overlapping region.

10. A recording control method of controlling recording on a medium by a recording head including a plurality of nozzle rows, and a relative movement of the recording head and the medium in a relative movement direction that intersects a nozzle alignment direction of the plurality of nozzle rows, wherein the plurality of nozzle rows include a first nozzle row, and a second nozzle row that partially overlaps the first nozzle row in the nozzle alignment direction;

when, in a recording region that is recorded on the medium during the relative movement, a region corresponding to a portion where the first nozzle row is present and the second nozzle row is not present is a first region, a region corresponding to an overlapping portion where the first nozzle row and the second nozzle row overlap each other is an overlapping region, a region corresponding to a portion where the second nozzle row is present and the first nozzle row is not present is a second region, a portion that corresponds to a part of the overlapping region and is continuous from the first region and is not continuous to the second region is a first portion, and a portion that corresponds to a part of the overlapping region and is continuous with the first region and the second region is a second portion, the method comprises:

a first portion control step of forming the first portion as a part of an output image on the medium in such a manner that a use rate of the first nozzle row of the overlapping portion is set to a first nozzle use rate; and a second portion control step of forming the second portion as a part of the output image on the medium in such a manner that the use rate of the first nozzle row of the overlapping portion is set to a second nozzle use rate; and the first nozzle use rate is higher than the second nozzle use rate.

* * * * *